US010285170B2

United States Patent
Nam et al.

(10) Patent No.: US 10,285,170 B2
(45) Date of Patent: May 7, 2019

(54) METHOD AND APPARATUS FOR FRAME STRUCTURE FOR ADVANCED COMMUNICATION SYSTEMS

(71) Applicant: Samsung Electronics Co., Ltd, Suwon-si (KR)

(72) Inventors: Young-Han Nam, Plano, TX (US); Li Guo, Allen, TX (US); Sudhir Ramakrishna, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/407,218

(22) Filed: Jan. 16, 2017

(65) Prior Publication Data

US 2017/0208568 A1 Jul. 20, 2017

Related U.S. Application Data

(60) Provisional application No. 62/280,417, filed on Jan. 19, 2016, provisional application No. 62/375,307, (Continued)

(51) Int. Cl.
*H04W 72/04* (2009.01)
*H04W 72/12* (2009.01)
(Continued)

(52) U.S. Cl.
CPC ......... *H04W 72/042* (2013.01); *H04L 5/0057* (2013.01); *H04W 72/121* (2013.01); *H04W 88/02* (2013.01); *H04W 88/08* (2013.01)

(58) Field of Classification Search
CPC ............. H04W 72/042; H04W 72/121; H04W 88/02; H04W 88/08; H04L 5/0057
See application file for complete search history.

(56) References Cited

U.S. PATENT DOCUMENTS

2014/0029569 A1* 1/2014 Ni ......................... H04W 24/02
370/330
2014/0126409 A1 5/2014 Ahn et al.
(Continued)

FOREIGN PATENT DOCUMENTS

EP 2670187 A1 12/2013
EP 2672648 A1 12/2013

OTHER PUBLICATIONS

3GPP TSG RAN WG1 Meeting #79; R1-144759; "Discussions on FD-MIMO with 8 to 64 TXRUs"; San Francisco, USA, Nov. 17-21, 2014—2 Pages.
(Continued)

*Primary Examiner* — Jianye Wu

(57) ABSTRACT

A method of a user equipment (UE) in a wireless communication system. The method comprises receiving, from a base station (BS), a dynamic downlink control signal including sounding reference signal (SRS) resource and configuration information based on user pool scheduling information, wherein the UE is included in a user pool group determined by the user pool scheduling information. The method further comprises determining the SRS resource and configuration information included in the user pool scheduling information received by the dynamic downlink control signal and transmitting, to the BS, SRS based on the SRS resource and configuration information included in the user pool scheduling information.

20 Claims, 15 Drawing Sheets

Related U.S. Application Data filed on Aug. 15, 2016, provisional application No. 62/410,488, filed on Oct. 20, 2016, provisional application No. 62/442,706, filed on Jan. 5, 2017.

(51) Int. Cl.
*H04L 5/00* (2006.01)
*H04W 88/02* (2009.01)
*H04W 88/08* (2009.01)

(56) References Cited

U.S. PATENT DOCUMENTS

2015/0257130 A1* 9/2015 Lee ................... H04W 72/042
370/336
2015/0334690 A1 11/2015 Papasakellariou et al.

OTHER PUBLICATIONS

ISA/KR, "International Search Report," Application No. PCT/KR2017/000690, dated Apr. 27, 2017, Korean Intellectual Property Office, Daejeon, Korea, 3 pages.

* cited by examiner

METHOD AND APPARATUS FOR FRAME STRUCTURE FOR ADVANCED COMMUNICATION SYSTEMS

CROSS-REFERENCE TO RELATED APPLICATIONS AND CLAIM OF PRIORITY

The present application claims priority to U.S. Provisional Patent Application Ser. No. 62/280,417, filed on Jan. 19, 2016, entitled "Method and Apparatus for Frame Structure for Advanced Communication Systems;" U.S. Provisional Patent Application Ser. No. 62/375,307, filed on Aug. 15, 2016, entitled "Method and Apparatus for Frame Structure for Advanced Communication Systems;" and U.S. Provisional Patent Application Ser. No. 62/410,488, filed on Oct. 20, 2016, entitled "Method and Apparatus for Frame Structure for Advanced Communication Systems;" U.S. Provisional Patent Application Ser. No. 62/442,706, filed on Jan. 5, 2017, entitled "Method and Apparatus for Frame Structure for Advanced Communication Systems." The content of the above-identified patent documents are incorporated herein by reference.

TECHNICAL FIELD

The present application relates generally advanced communication systems in wireless communication systems. More specifically, this disclosure relates to a frame structure for advanced communication systems.

BACKGROUND $5^{th}$ generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of $10^6$ devices/$km^2$, a network energy efficiency improvement of 100× and an area traffic capacity of 10 Mb/s/$m^2$. While all the requirements need not be met simultaneously, the design of 5G networks should provide flexibility to support various applications meeting part of the above requirements on a use case basis.

SUMMARY

The present disclosure relates to a pre-$5^{th}$-Generation (5G) or 5G communication system to be provided for supporting higher data rates beyond $4^{th}$-Generation (4G) communication system such as long term evolution (LTE). Embodiments of the present disclosure provide an enabling flexible numerology in multi-user MIMO systems.

In one embodiment, a user equipment (UE) in a wireless communication system is provided. The UE includes a transceiver configured to receive, from a base station (BS), a dynamic downlink control signal including sounding reference signal (SRS) resource and configuration information based on user pool scheduling information, wherein the UE is included in a user pool group determined by the user pool scheduling information. The UE further includes at least one processor configured to determine the SRS resource and configuration information included in the user pool scheduling information received by the dynamic downlink control signal, wherein the transceiver is further configured to transmit, to the BS, SRS based on the SRS resource and configuration information included in the user pool scheduling information.

In another embodiment, a base station (BS) in a wireless communication system is provided. The BS includes at least one processor configured to determine a user pool group including a plurality of UEs in accordance with user pool scheduling information and determine sounding reference signal (SRS) resource and configuration information for the plurality of UEs included in the user pool group. The BS further includes a transceiver configured to transmit, to the plurality of UEs included in the user pool group, a dynamic downlink control signal including the SRS resource and configuration information based on the user pool scheduling information and receive, from the plurality of UEs included in the user pool group, SRS based on the SRS resource and configuration information included in the user pool scheduling information transmitted from the BS.

In yet another embodiment, a method of a user equipment (UE) in a wireless communication system is provided. The method comprises receiving, from a base station (BS), a dynamic downlink control signal including sounding reference signal (SRS) resource and configuration information based on user pool scheduling information, wherein the UE is included in a user pool group determined by the user pool scheduling information. The method further comprises determining the SRS resource and configuration information included in the user pool scheduling information received by the dynamic downlink control signal and transmitting, to the BS, SRS based on the SRS resource and configuration information included in the user pool scheduling information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following document is hereby incorporated by reference into the present disclosure as if fully set forth herein: 3GPP R1-144759, "Discussion on FD-MIMO with 8 to 64 TXRUs," Samsung.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
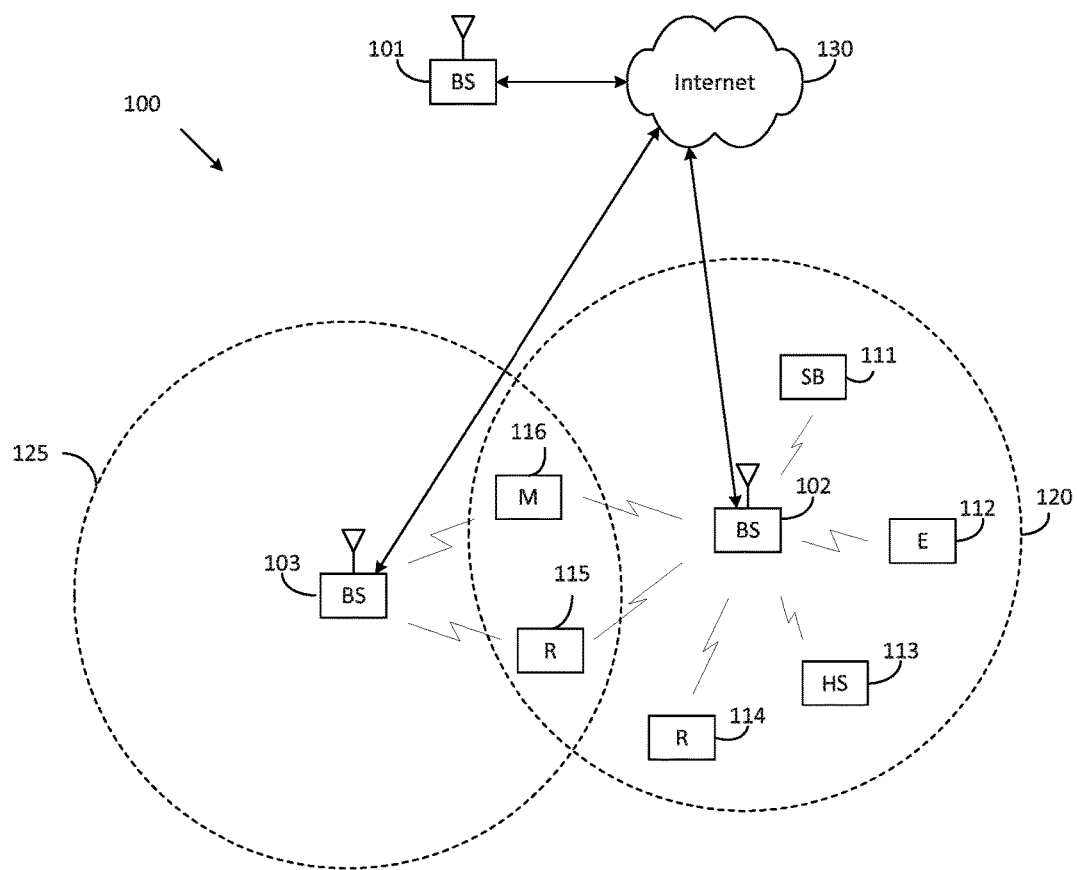
FIG. 1 illustrates an example wireless network according to embodiments of the present disclosure.
Figure 2:
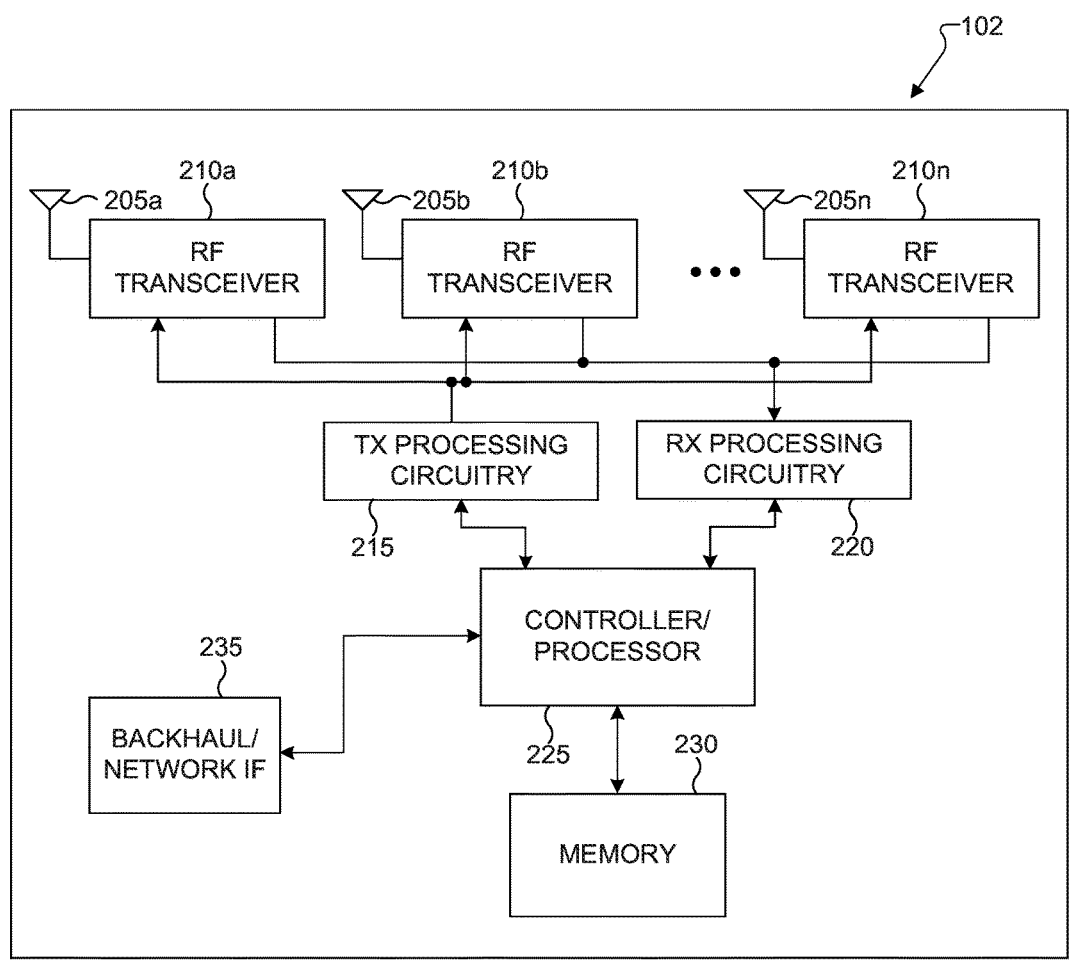
FIG. 2 illustrates an example eNB 102 according to embodiments of the present disclosure.
Figure 3:
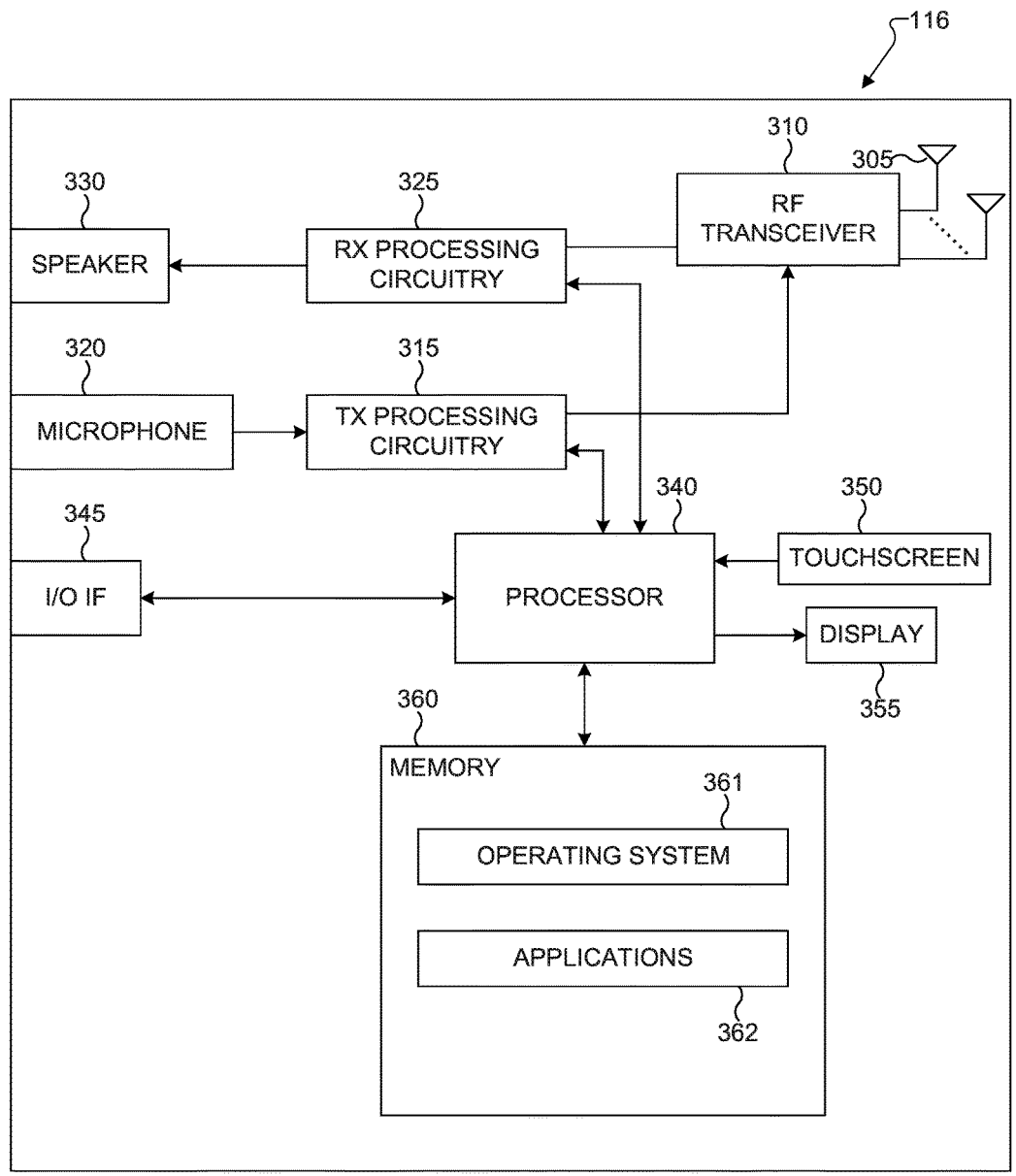
FIG. 3 illustrates an example UE 116 according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 100 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 200 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is also capable of transmitting, to the plurality of UEs included in the user pool group, a dynamic downlink control signal including the SRS resource and configuration information based on the user pool scheduling information and receiving, from the plurality of UEs included in the user pool group, SRS based on the SRS resource and configuration information included in the user pool scheduling information transmitted from the BS.

In some embodiments, the RF transceiver 210a-201n is also capable of transmitting, to the plurality of UEs included in the user pool group, the dynamic downlink control signal including the CSI-RS resource and configuration information based on the user pool scheduling information and receiving, from the plurality of UEs included in the user pool group, a CSI based on the CSI-RS resource and configuration information included in the user pool scheduling information transmitted from the BS.

In some embodiments, the RF transceiver 210a-201n is also capable of transmitting, to the plurality of UEs included in the user pool group, the dynamic downlink control signal including the PUCCH resource and configuration information based on the user pool scheduling information and receiving, from the plurality of UEs included in the user pool group, a channel quality information (CQI) based on the PUCCH resource and configuration information transmitted from the BS.

In some embodiments, the RF transceiver 210a-201n is also capable of transmitting, to each of scheduled UEs of the plurality of UEs included in the user pool group, the DCI in accordance with a radio network temporary identification (RNTI) over a UE-common search space of the dynamic downlink control signal.

In such embodiments, the DCI includes active user set information indicating identity of each of the scheduled UEs in the user pool group, the active user set information comprising bitmap information that indicate the identity of each of the scheduled UEs.

In such embodiments, the DCI includes a group scheduling mode indicating a configuration of each of the scheduled UEs in the user pool group, the group scheduling mode comprises at least one of measurement, reception, or transmission information of at least one of uplink or downlink signal between the BS and each of the scheduled UEs included in the user pool group.

In such embodiments, the DCI includes reference signal (RS) allocation information for at least one active UE of the plurality of UEs included in the user pool group, the RS allocation information comprising at least one of a first RS port for a signal part or a second RS port for interference part in accordance with CSI estimation.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is also capable of determining a user pool group including a plurality of UEs in accordance with user pool scheduling information and determining sounding reference signal (SRS) resource and configuration information for the plurality of UEs included in the user pool group.

In some embodiments, the controller/processor 225 is also capable of determining channel state information-reference signal (CSI-RS) resource and configuration information for the plurality of UEs included in the user pool group.

In some embodiments, the controller/processor 225 is also capable of determining physical uplink control channel (PUCCH) resource and configuration information for the plurality of UEs included in the user pool group.

In some embodiments, the controller/processor 225 is also capable of determining downlink channel information (DCI) for the plurality of UEs included in the user pool group.

In such embodiments, the DCI includes active user set information indicating identity of each of the scheduled UEs in the user pool group, the active user set information comprising bitmap information that indicate the identity of each of the scheduled UEs.

In such embodiments, the DCI includes a group scheduling mode indicating a configuration of each of the scheduled UEs in the user pool group, the group scheduling mode comprises at least one of measurement, reception, or transmission information of at least one of uplink or downlink signal between the BS and each of the scheduled UEs included in the user pool group.

In such embodiments, the DCI includes reference signal (RS) allocation information for at least one active UE of the plurality of UEs included in the user pool group, the RS allocation information comprising at least one of a first RS port for a signal part or a second RS port for interference part in accordance with CSI estimation.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 300 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), a dynamic downlink control signal including sounding reference signal (SRS) resource and configuration information based on user pool scheduling information, wherein the UE is included in a user pool group determined by the user pool scheduling information and transmitting, to the BS, SRS based on the SRS resource and configuration information included in the user pool scheduling information.

In some embodiments, the RF transceiver 310 is capable of receiving the dynamic downlink control signal including channel state information-reference signal (CSI-RS) resource and configuration information based on user pool scheduling information and transmitting, to the BS, CSI based on the CSI-RS resource and configuration information included in the user pool scheduling information received from the BS.

In some embodiments, the RF transceiver 310 is capable of receiving the dynamic downlink control signal including physical uplink control channel (PUCCH) resource and configuration information based on user pool scheduling information and transmitting, to the BS, channel quality information (CQI) based on the PUCCH resource and configuration information included in the user pool scheduling information received from the BS.

In some embodiments, the RF transceiver 310 is capable of receiving downlink channel information (DCI) in accordance with a radio network temporary identification (RNTI) over a UE-common search space of the dynamic downlink control signal based on the user pool scheduling information.

In such embodiments, the DCI includes active user set information indicating identity of each of scheduled UEs in the user pool group, the active user set information comprising bitmap information that indicate the identity of each of the scheduled UEs.

In such embodiments, the DCI includes a group scheduling mode indicating a configuration of each of scheduled UEs in the user pool group, the group scheduling mode comprises at least one of measurement, reception, or transmission information of at least one of uplink or downlink signal between the BS and each of the scheduled UEs included in the user pool group.

In such embodiments, the DCI includes reference signal (RS) allocation information for at least one active UE of a plurality of UEs included in the user pool group, the RS allocation information comprising at least one of a first RS port for a signal part or a second RS port for interference part in accordance with CSI estimation.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of determining the SRS resource and configuration information included in the user pool scheduling information received by the dynamic downlink control signal.

In some embodiments, the processor 340 is also capable of determining the CSI-RS resource and configuration information included in the user pool scheduling information.

In some embodiments, the processor 340 is also capable of determining the PUCCH resource and configuration information included in the user pool scheduling information.

In some embodiments, the processor 340 is also capable of determining the DCI based on the user pool group determined by the user pool scheduling information.

In such embodiments, the DCI includes active user set information indicating identity of each of scheduled UEs in the user pool group, the active user set information comprising bitmap information that indicate the identity of each of the scheduled UEs.

In such embodiments, the DCI includes a group scheduling mode indicating a configuration of each of scheduled UEs in the user pool group, the group scheduling mode comprises at least one of measurement, reception, or transmission information of at least one of uplink or downlink signal between the BS and each of the scheduled UEs included in the user pool group.

In such embodiments, the DCI includes reference signal (RS) allocation information for at least one active UE of a plurality of UEs included in the user pool group, the RS allocation information comprising at least one of a first RS port for a signal part or a second RS port for interference part in accordance with CSI estimation.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
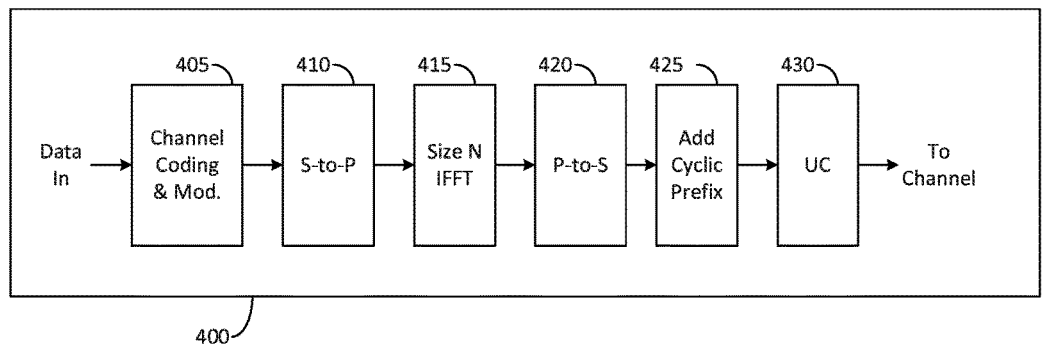
FIG. 4A illustrates a high-level diagram of an orthogonal frequency division multiple access transmit path according to embodiments of the present disclosure.
Figure 4B:
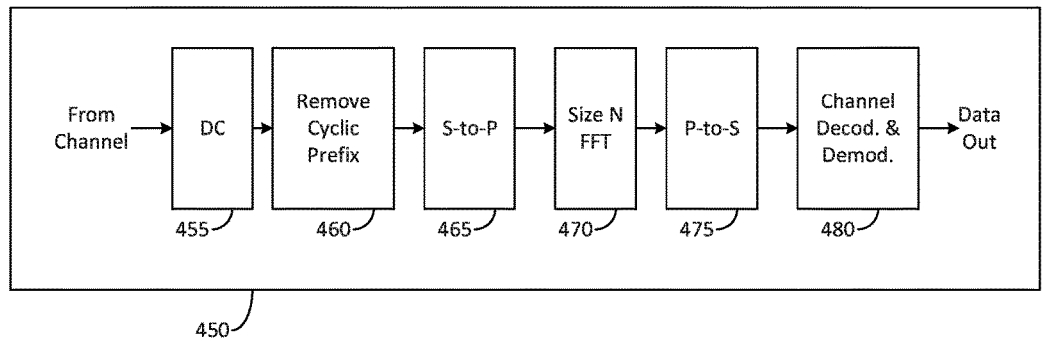
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

In wireless communication systems, several parameters are adapted on a UE-specific basis such as the modulation, the coding scheme or the rank of transmissions. However, in current cellular systems such as a long-term evolution (LTE), most numerology parameters such as the sub-carrier spacing or the length of the cyclic prefix (CP) for all users is cell-specific and common to all UEs. An LTE, for example, has a sub-carrier spacing of 15 kHz for transmissions (except for broadcast services using multicast-broadcast single-frequency network (MBSFN), which is fixed at 7.5 kHz sub-carrier spacing). For 5G communications, the new requirements proposed would benefit from adaptation of the sub-carrier spacing and/or CP length on a per user basis.

In particular, varying the sub-carrier spacing depending on the UE can provide the some advantages. One advantage is low latency transmissions. In such example, wider sub-carrier spacing can lead to shorter symbol duration, which reduces the transmission latency. The FFT/IFFT size also reduces, which can reduce the power consumption requirements. Another advantage is improved channel estimation for high speed users. At higher speeds, there is lower correlation between channel measurements. Hence, channel estimation should be done more frequently, which can be enabled with shorter symbol duration or wider subcarrier spacing. This can be beneficial for vehicular communication systems. Yet another advantage is low peak-to average power ratio (PAPR), as smaller sub-carrier spacing can lower PAPR. Yet another advantage is to be able to better support large bandwidth systems. Using 15 KHz sub-carrier spacings for large bandwidth systems would require large FFT sizes, which may lead to implementation constraints. For example, a 120 MHz system would require a FFT of size 8192 or larger. If wider subcarrier spacing is utilized, the FFT size can be reduced. Yet another advantage is for better supporting mmWave systems. At mmWave frequencies, a larger sub-carrier spacing may be required to compensate for increased phase noise in the RF.

In particular, varying the CP length depending on the UE can provide advantages, including improved efficiency; since the CP is an overhead for the transmission, reducing the CP can lead to improved efficiency in transmission.

It has been shown that with under TDD channel reciprocity assumption, 64-Tx-antenna full-dimensional; multi-input multi-output (FD-MIMO) allowing high-order multi-user-MIMO (MU-MIMO) with signal-to-leakage-ratio (SLNR) precoding achieves up to ~6× cell-average and cell-edge throughput gain, as against 8-Tx-antenna baseline with maximum-ratio-transmission (MRT) transmissions.

When all-user-full-bandwidth (AUFB) scheduling method is used, a serving cell schedules all the users served by the serving cell in the full BW with applying MU-MIMO precoding. The AUFB achieves almost 1.5× superior performance to PF-4. In addition to the performance benefits, AUFB scheduling has complexity benefits—the complexity is very small as compared to other methods. One of the challenges to use AUFB in practice is that eNB needs to have accurate channel state information (CSI) to realize this performance. In frequency division duplexing (FDD) systems in which CSI is obtained from UE feedback, the level of CSI accuracy may not be sufficient for AUFB/SLNR to achieve the performance, mainly owing to the quantization errors. However, in TDD systems, the CSI is obtained from channel sounding and channel reciprocity (with Tx/Rx calibration), which seem to be a more promising candidate for obtaining the performance of the AUFB/SLNR.

For FD-MIMO considered in 3GPP specification, it is assumed that the antennas equipped at the eNB are placed in a rectangular fashion. The FDD CSI feedback design is made according to this assumption, and the CSI feedback may not be able to be used for other antenna configurations, e.g., spherical or cylindrical antenna configurations. However, in TDD systems, channel sounding and channel reciprocity can be exploited to generate accurate CSI for any antenna configurations. Hence, it can be said that channel sounding based MIMO systems are more versatile to be used for various antenna configurations than CSI feedback based schemes.

Figure 5:
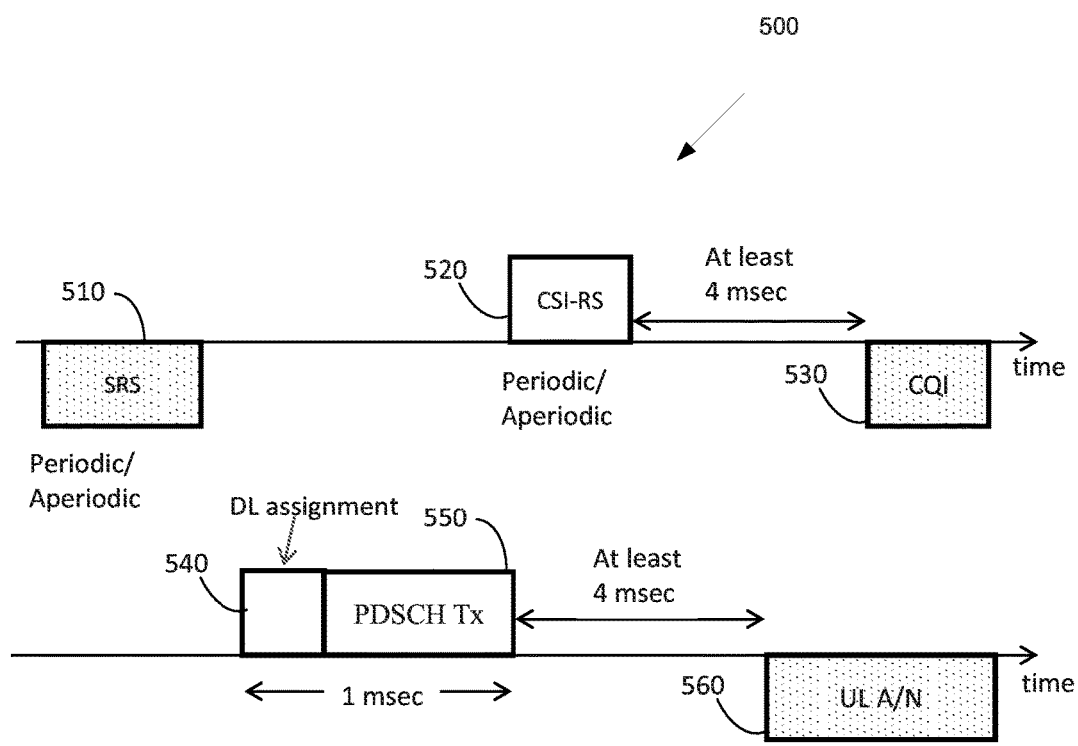
FIG. 5 illustrates an example channel state information (CSI) acquisition and downlink (DL) transmission procedure in long-term evolution-compliant time division duplexing (LTE-compliant TDD) systems according to embodiments of the present disclosure.

FIG. 5 500 illustrates an example channel state information (CSI) acquisition and downlink (DL) transmission procedure in long-term evolution-compliant time division duplexing (LTE-compliant TDD) systems according to embodiments of the present disclosure. An embodiment of the CSI acquisition and DL transmission procedure in long-term evolution-compliant time division duplexing (LTE-compliant TDD) systems shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the signaling and PHY signal transmissions according to 500 can be implemented by UE and eNB complying 3GPP LTE standards specifications. For CSI acquisition 500, the network (or eNB) may configure in a higher layer, surrounding reference signal (SRS) 510 and channel state information-reference signal (CSI-RS) 520 for UE. When configured, the UE transmits SRS 510 in designated time-frequency resources, and receives CSI-RS 520 in a set of designated time-frequency resources. Once receiving the SRS 510, the eNB processes the SRS 510 to derive channel matrix, which can be used for DL precoding matrix generation for DL transmissions (e.g., SU-MIMO, MU-MIMO, etc.). On the other hand, UE uses CSI-RS 520 to derive channel quality indicator (CQI) 530, and sometimes also at least one of precode matrix indicator (PMI) and rank indicator (RI) depending on the configuration.

In some embodiments, an eNB may precode the CSI-RS 520 utilizing the channel matrix estimated with the SRS 510; in such embodiments, the CQI 530 estimated and reported by the UE corresponds to the CQI of the channels whose precoding is according to CSI-RS 520.

In some other embodiments, an eNB may transmit the CSI-RS 520 on non-precoded CSI-RS ports; in such embodiments, the UE is typically configured to report CQI/PMI/RI, and the CQI 230 corresponds to the reported PMI and RI. According to the 3GPP specifications, the UE is given at least 4 milliseconds (msec) to derive and prepare a transmission of CQI/PMI/RI after receiving the CSI-RS 220.

Based on the CSI (i.e., CQI/PMI/RI), an eNB determines user scheduling and performs link adaptation. In a transmit time interval (TTI), or a subframe, the eNB transmits DL assignment 540 targeted to the UE in the first a few orthogonal frequency division multiplexing (OFDM) symbols of the TTI and the eNB transmits a physical downlink shared channel (PDSCH) 550 for the UE in the rest of the OFDM symbols of the TTI in accordance with the DL assignment 540. For MU-MIMO, the eNB may schedule multiple UEs in a same set of time-frequency resources for the physical downlink shared channel (PDSCH) 550. In response to the PDSCH 550, the UE reports UL A/N 560 in a moment later. According to the 3GPP specifications, the UE is given at least 4 msec to derive and prepare a transmission of A/N 260 after receiving the PDSCH 550.

The timing diagrams of 500 may concurrently happen or be interleaved in some embodiments. Some drawbacks of the 3GPP-LTE compliant operation are identified: a relatively large processing time (4 msec) is provisioned for CQI derivation. Because of this, the CQI 230 may be outdated when it is used for the precoding for PDSCH transmission 250; a relatively large processing time (4 msec) is provisioned for decoding of PDSCH 250; and SRS/CSI-RS are semi-statically configured to be transmitted and/or received in a set of periodically recurring subframes only. Aforementioned operations would work when all the subframes are available for the UE. However, when transmission and/or reception opportunities for the UE are determined in a more dynamic manner (e.g., when the system operates in a non-licensed band, or the system operates in a more flexible manner, to provide with various services requiring different QoS and/or to minimize energy/power consumption at both UE and eNB sides), this periodic allocation of SRS/CSI-RS resource pool can be inefficient and not sufficient. This can incur outdated CSI, or interruption of PDSCH transmissions, and so on.

Figure 6:
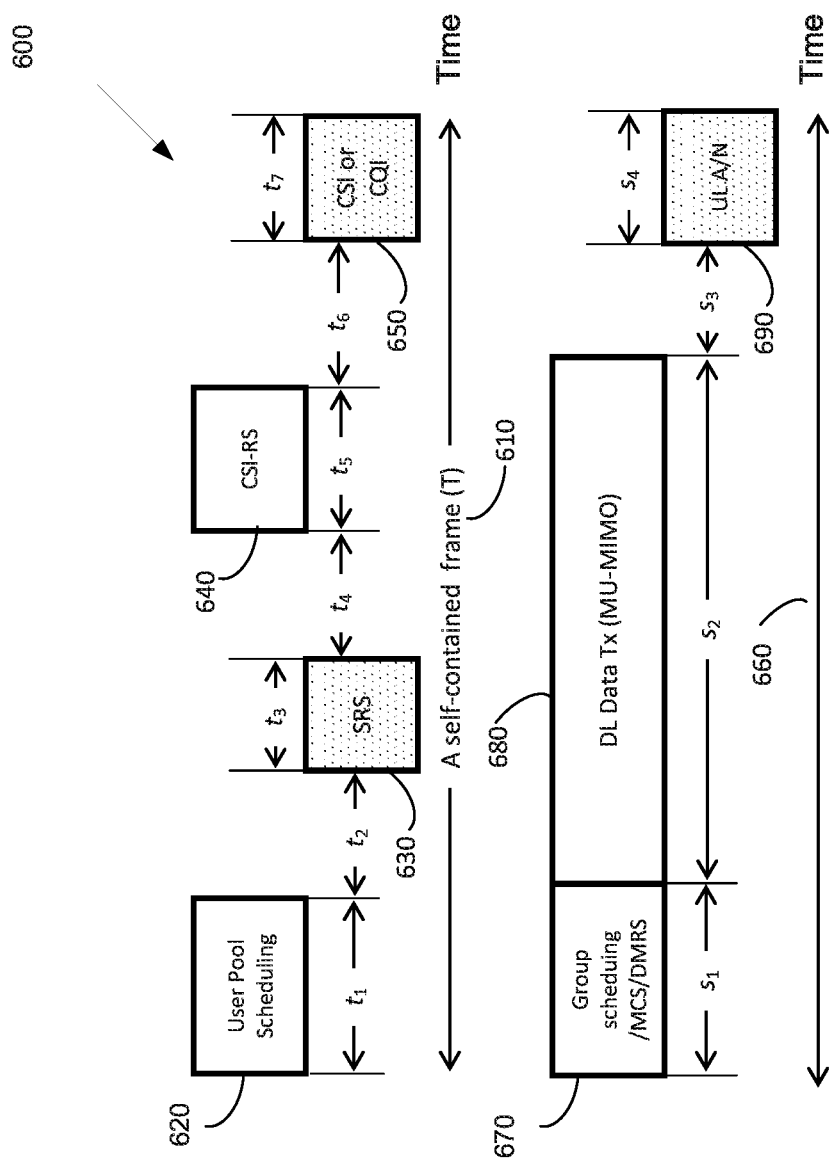
FIG. 6 illustrates an example CSI acquisition and DL transmission procedure according to embodiments of the present disclosure.

FIG. 6 600 illustrates an example CSI acquisition and DL transmission procedure according to embodiments of the present disclosure. An embodiment of the CSI acquisition and DL transmission procedure in LTE-compliant TDD systems shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

The time lengths in FIG. 6 are in terms of seconds, and may also be interpreted in terms of number of OFDM symbols. Two self-contained frames (or subframes) of time lengths T and S, 610 and 660, are described. A first type of self-contained frame 610 is for CSI acquisition, and a second type of self-contained frame 660 is for data transmission.

The first self-contained frame, 610, is of length T, and comprises user pool scheduling 620, SRS 630 transmission, MU precoded CSI-RS 640 and CQI 650. In the beginning of the self-contained frame 610 (e.g., subframe), the eNB signals a group of UEs of user pool scheduling 620, to indicate resources and configurations for the next steps, i.e., SRS transmission 630 and CQI 650 derivation and reporting based upon the configured CSI-RS 640.

In some embodiments, the user pool scheduling 620 includes some or all of the following information: indices of UEs that belonging to the user pool; SRS resource & configuration for the UEs in the user pool for SRS transmission 630; CSI-RS resource & configuration for the UEs for CSI-RS reception 640; and PUCH resource & configuration for the UEs for CQI 650 reporting. In such embodiments, "resource" may refer to a combination of at least one of time, frequency (or BW), code, etc.

The user pool scheduling 620 is transmitted in a PDCH (or PDCCH), and the time length of 620 is $t_1$. Between user pool scheduling 620 and SRS transmission 630, some guard period may be necessary for UL timing advance and UE's processing time, in which case $t_2>0$ (otherwise $t_2=0$). The time duration $t_3$ for SRS transmission 630 may be dependent upon the number of UEs in the pool indicated by 620. In one example, up to N UEs' SRS can be multiplexed in each OFDM symbol; in this case, $t_3$=ceil ($N_{UE}$/N) OFDM symbols. Here N is a positive integer.

Between SRS transmission 630 and CSI-RS reception 640, some guard period, $t_4$, may be necessary for eNB's SRS processing and deriving the precoding vectors for the CSI-RS, in which case $t_4>0$ (otherwise $t_4=0$). In some embodiments, CSI-RS are precoded according to the precoding vectors derived with the SRS. The time duration $t_5$ for CSI-RS 640 may be dependent upon the number of UEs in the pool indicated by 620. In one example, up to N UEs' CSI-RS can be multiplexed in each OFDM symbol; in this case, $t_5$=ceil ($N_{UE}$/N) OFDM symbols. Here N is a positive integer. Between CSI-RS 640 reception and CQI 650 reporting, some guard period, $t_6$, may be necessary for UE's CSI-RS processing and deriving the CSI feedback (i.e., CQI). The UE reports CQI 650 in a PUCH in time duration of $t_7$, according to the configuration in the user pool scheduling 620. The total time duration of the self-contained frame 610 is $$T = \sum_{i=1}^{7} t_i$$

which can be a constant or a variable determined dependent upon the total number of UEs in the pool, determined according to the configuration in the user pool scheduling 620.

The second self-contained frame, 660, is of length S, and comprises group scheduling 670 (e.g., MCS, DMRS), DL data 680 Tx and UL A/N 690. In the beginning of the self-contained subframe 660, the eNB signals a group of UEs of group scheduling 670 (e.g., MCS/DMRS), so that those UEs in the user group can prepare for the next steps, i.e., DL data 680 transmission and UL A/N reporting 690. The configuration in the group scheduling 670 in the group scheduling includes some or all of the following information: indices of UEs that belonging to the user group; resource & configuration for DL data 680 Tx for the UEs in the user group, including DMRS port indication, MCS and PRB allocations for individual UEs etc.; PUCH resource & configuration for the UEs for A/N reporting 690; and time duration of DL data 680 Tx (e.g., in terms of OFDM symbols or in terms of time slots).

In some embodiments, the configuration in the group scheduling 670 does not include PRB allocation information, in which case the UEs are configured to receive the DL data in the full BW. In one such embodiment, the full BW corresponds to a DL system BW. In another such embodiment, the full BW corresponds to a DL BW configured for the group of UEs (may be indicated in User pool scheduling 620, or a separate DL control signaling).

In some embodiments, the configuration in the group scheduling 670 includes an information field to indicate whether WB precoding or SB precoding is applied in the DL data 680. When WB precoding is indicated, the UE may assume that the same precoder is used across the scheduled BW for all the scheduled antenna ports (including antenna ports used for other UEs as well) in the current TTI; when SB precoding is indicated, the UE may not have any assumptions on how precoders in different physical resource blocks (PRBs) are correlated when demodulating DL data 680.

The group scheduling 670 is transmitted in a PDCH, and the time length of 670 is $S_1$. According to the configuration in the group scheduling 670, DL data 680 is transmitted, potentially in an MU-MIMO manner in duration of $s_2$ (OFDM symbols). Typically $s_2$ is much larger than $S_i$. The larger $s_2$, the better spectral efficiency can be achieved, mainly owing to the smaller overhead. Between DL data 680 reception and UL A/N feedback 690, a guard period may be necessary for UL timing advance and UE's processing time, in which case $s_3>0$. The UEs in the user group are configured to report UL A/N 690, generated according to the decoding results of the DL data 680. The UL A/N is transmitted in duration of $s_4$ OFDM symbols. The total time duration of the self-contained frame 660 is $$S = \sum_{i=1}^{4} s_i,$$

which can be a variable determined dependent upon the total number of UEs in the pool, determined according to the configuration in the group scheduling 670.

Utilizing these two types of self-contained frames 610 and 660, an eNB can flexibly adjust the ratio of data transmission and CSI acquisition. In a static environment, an eNB may configure the first type of self-contained frames 610 less frequently than the second type of self-contained frames 660. In a more dynamic environment, an eNB may configure the second type of self-contained frames 660 in a similar frequency to the first type of self-contained frames 610. The type of self-contained frames should be informed to a UE. In one method, the type is indicated in both configuration signals of 620 and 670. In some embodiments, a control message in another type of frame (other than 610 or 660) scheduling either of the self-contained frames 610 or 660 includes the type indication.

In some embodiments, the same PUCH format is used for CQI 650 and UL A/N 690. In some embodiments, a self-contained frame (or subframe) comprises a concatenation of a frame of the first type of self-contained frame 610 followed by a frame of the second type of self-contained frame 660, whose time duration is T+S. This concatenated self-contained subframe provides all the necessary procedures for a single MU-MIMO transmission. It is noted that in the concatenated subframe, useful portion for data transmission is only 680 ($s_2$), and all the other time durations are used for control signaling, which can be regarded as overhead. In particular, the first type of self-contained frame 610 of length T contains only overhead portion.

The overhead ratio of the concatenated frame in this case is approximately $s_2/(T+S)$. If T is similar to S, the overhead of the concatenated frame becomes more than 50%, and the frame structure is quite inefficient. In typical designs, T may be smaller than S, but it may be more desirable if T can be further reduced. One such design to reduce the duration of T is devised in the next embodiment.

In some embodiments, the self-contained frame comprises a concatenation of 610 and 660, and also $t_5=t_6=t_7=0$, i.e., CSI-RS 640 and CQI 650 are dropped from the frame of 610 and $T=t_1+t_2+t_3+t_4$. In this case, either the time duration of the frame or the overhead portion of the frame can be reduced (as T becomes smaller). It is noted that the guard time $t_4>0$ in this case can give time to the eNB to estimate channels using the SRS transmission 630 and decide the group scheduling 670. The user group indicated by 670 may be represented by a bitmap, whose length is the same as the number of UEs in the user pool indicated by 620. When a bit on a position i of the bitmap is one, a user on position i of the user pool will receive DL data in 680; when the bit is zero, the user shall not expect DL data transmission in 680.

In some embodiments, UL PUCH used for A/N transmission 690 also includes CQI obtained from the demodulation of the DL data to help eNB's future link adaptation. This self-contained frame structure may be useful when collision avoidance protocol, e.g., RTS/CTS in IEEE 802.11, is in place, in which case DL interference variance among different UEs is small and the CQI is not critical for link adaptation.

Figure 7:
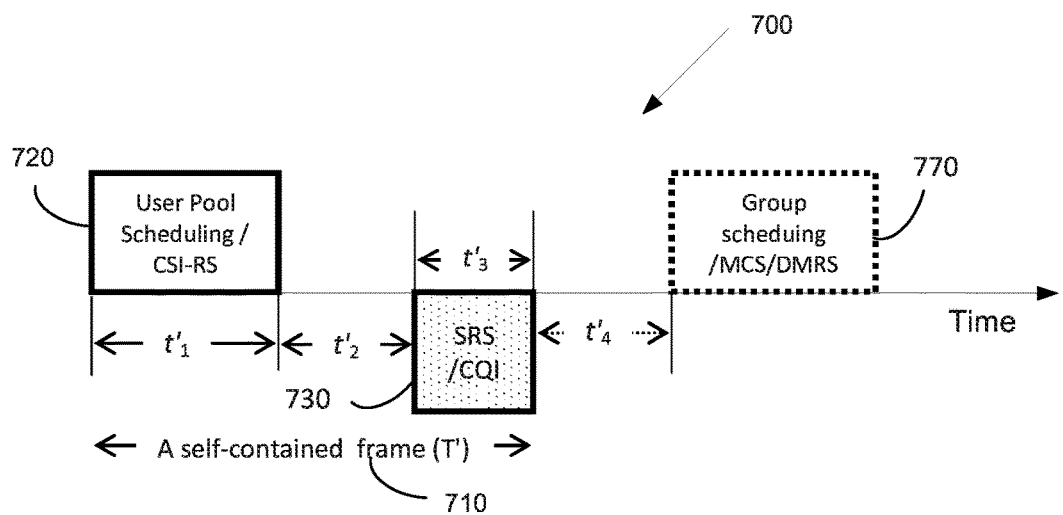
FIG. 7 illustrates an example frame structure according to embodiments of the present disclosure.

FIG. 7 700 illustrates an example frame structure according to embodiments of the present disclosure. An embodiment of the self-contained frame structure shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

In some embodiments, a self-contained frame 700 of length T replaces the frame/subframe of length T, in those embodiments making use of the frame/subframe. In one such embodiment, a self-contained frame (or subframe) comprises a concatenation of a frame of the first type of self-contained frame 710 followed by a frame of the second type of self-contained frame 660, whose time duration is T'+S. The first type of self-contained frame 710 comprises user pool scheduling and CSI-RS duration of 720 of length $t'_1$, followed by processing gap duration of length $t'_2$. Followed by the processing gap duration, the duration 730 (e.g., SRS/CQI) of length $t'_3$ occurs. In case, a self-contained frame (or subframe) comprises a concatenation of 710 and 660, processing gap duration of length $t'_4$ is also provisioned before the group scheduling 670 happens. This alternative subframe (e.g., 710) incurs less number of UL/DL switching instances, and hence it is more efficient in terms of overhead. In such a case, the subframe duration T of 710 can be less than T of 610.

In some embodiments, the user pool scheduling 720, transmitted in a PDCH, includes some or all of the following information: indices of UEs that belonging to the user pool; SRS resource configuration for the UEs in the user pool for SRS transmission included in the duration 730; CSI-RS resource configuration for the UEs for CSI-RS reception; PUCH resource configuration for the UEs for CQI reporting included in the duration 730; and SRS resource & configuration for SRS transmission in the duration 730.

Figure 8:
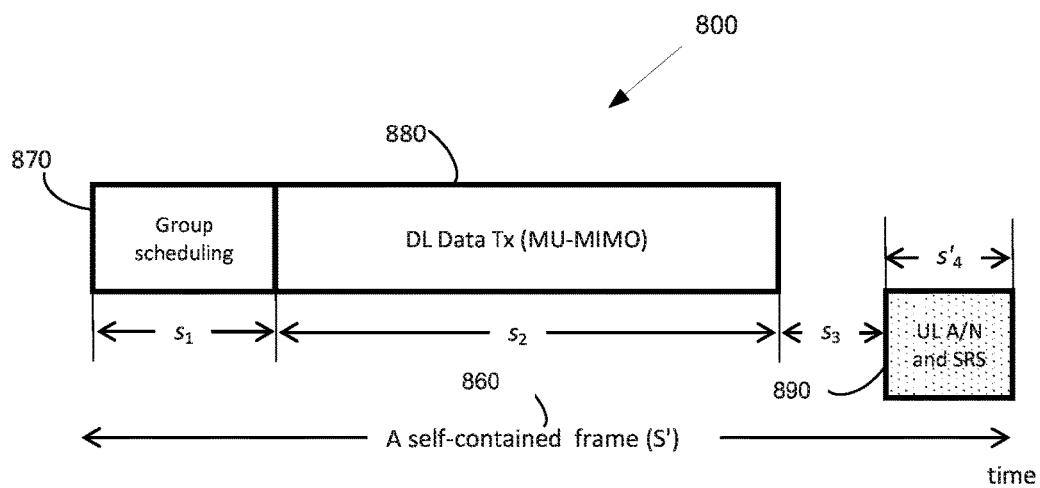
FIG. 8 illustrates another example frame structure according to embodiments of the present disclosure.

FIG. 8 800 illustrates another example frame structure according to embodiments of the present disclosure. An embodiment of the self-contained frame structure shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In some embodiments, a self-contained frame 860 of length S' replaces the frame/subframe 660 of length S, in those embodiments making use of 660. At the beginning of the self-contained frame 860 (e.g., subframe), the eNB signals a group of UEs of group scheduling 870, so that those UEs in the user group can prepare for the next steps, i.e., DL data 880 reception and UL A/N reporting and SRS transmission 890. The configuration in the group scheduling 870 includes some or all of the following information: indices of UEs that belongs to the user group; resource & configuration for DL data 880 Tx for the UEs in user group, including DMRS port indication, MCS and PRB allocation for each individual UE; PUCH resource & configuration for the UEs for A/N reporting in 890; SRS resource & configuration for SRS transmission in 890; time duration of DL data 880 Tx. In such embodiments, 890 contains at least one of: PUCCH to transmit A/N; or SRS.

Figure 9:
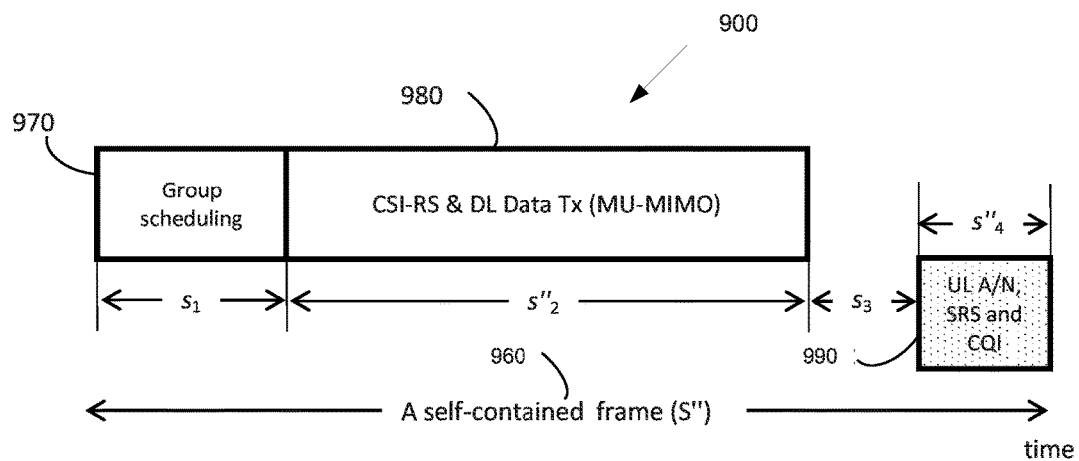
FIG. 9 illustrates yet another example frame structure according to embodiments of the present disclosure.

FIG. 9 900 illustrates yet another example frame structure according to embodiments of the present disclosure. An embodiment of the self-contained frame structure shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In some embodiments, a self-contained frame 960 of length 5" replaces the frame/subframe 660 of length S. At the beginning of the self-contained subframe, the eNB signals a group of UEs of group scheduling 970 configuration, so that those UEs in the user group can prepare for the next steps, i.e., CSI-RS & DL data 980 transmission, UL A/N reporting, SRS transmission and CQI 990 reporting. The configuration in the group scheduling 970 includes some or all of the following information: indices of UEs that belongs to the user group; resource & configuration for DL data 980 Tx for the UEs in user group, including DMRS port indication, MCS and PRB allocation for each individual UE; PUCH resource configuration for the UEs for A/N reporting in 990; time duration of DL data 980 Tx data; CSI-RS configuration for those UEs for CSI-RS reception in 980; and PUCH resource configuration for the UEs for CQI/CSI reporting in 990.

In some embodiments, the CSI-RS can also be used as DMRS for demodulation of DL data. In some embodiments, a UE is configured to receive two types of self-contained subframes for DL MIMO. A first type of self-contained subframes is scheduled to help eNB to acquire DL CSI; examples are 610 and 710. A second type of self-contained subframes is scheduled for actual data transmission to the UE; examples are 660, 760 and 860. In some embodiments, a UE is configured to receive one type of self-contained subframes for DL MIMO, comprising a concatenation of two durations, wherein the first duration is one of 610/710; and the second duration is one of 660/760/860. In such embodiments, 990 contains at least one of: PUCCH to transmit A/N; PUCCH to transmit CQI/CSI; or SRS.

The multi-user SRS and multi-user CSI-RS are provided to a group of UEs such that the eNB (e.g., gNB) can perform multi-user precoding and link adaptation based on SRS channel estimation and UE feedback. In addition, the multi-user DL data (PDSCH) is provided together with multi-user DMRS possibly on orthogonal DMRS ports. The CSI-RS and DMRS may be configured in the same way, and have the same RE mapping pattern. (DL) RS may refer to any of the CSI-RS and DMRS, which may be configured for either purpose of CSI measurement or PDSCH demodulation or both purposes.

In order to measure CSI based on the MU hypothesis, the network applies UE-specific precoding on the multi-user CSI-RS. Individual UEs who measure CSI using the multi-user RS (which can also be used for DMRS for demodulating PDSCH) needs to identify their own RS resources/ports, relying on the signalling contents in the user pool scheduling. Suppose that N=8 UEs comprise a user pool. In such a case, each of 8 UEs needs to identify a CSI-RS resource that may be used for measuring the signal part of the CSI, and the other CSI-RS resources that may be used for measuring the interference part of the CSI. A DL control signalling can be provided to fulfil this necessity.

To facilitate the MU CSI estimation, it is proposed that a UE in the user pool is indicated with at least some of the following information in a UE-specific RRC signalling: an RNTI corresponding to a user pool; relative UE ID in the user pool. In one example, this ID is an integer selected from 1, 2, ..., X (or 0, 1, ..., X−1); a DL RS resource comprising $M_{RS}$ antenna ports to be mapped in ($L_{RS}$) numbers of consecutive OFDM symbols where, $M_{RS}$ is an integer less than or equal to a constant, and the constant can be either 8 or 16 and $L_{RS}$ is an integer, e.g., 1, 2, 4, ... ; a UE-specific SRS resource; total number of users in the user pool, X; $M_{RS}$; or $L_{RS}$.

Figure 10:
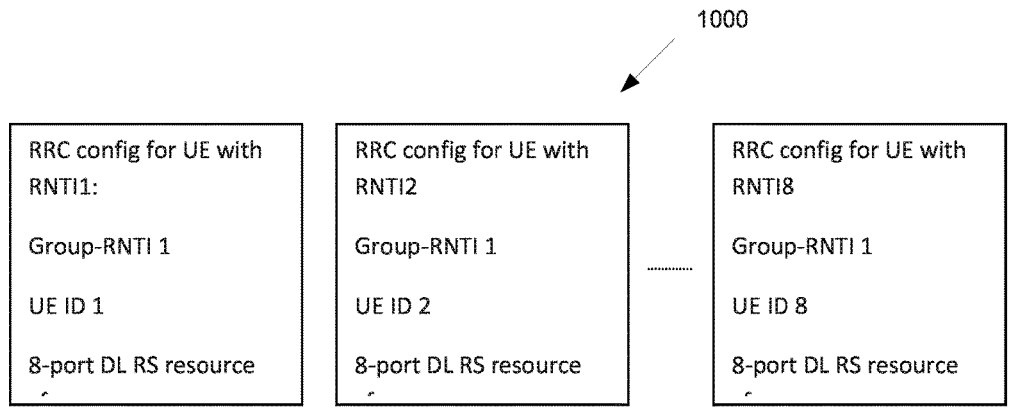
FIG. 10 illustrates an example radio resource control (RRC) signaling for UE group scheduling according to embodiments of the present disclosure.

FIG. 10 1000 illustrates an example radio resource control (RRC) signaling for UE group scheduling according to embodiments of the present disclosure. An embodiment of the RRC signaling for UE group scheduling shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure. As shown in FIG. 10, a user pool 1 1005 includes a group RNTI, a UE ID, an RRC configuration for a UE, and 8-port DL RS resource.

FIG. 10 1000 illustrates RRC signalling for 8 different UEs whose RNTIs are RNTI1 through RNTI8 to configure them in a user pool 1, where the group RNTI for the user pool 1 is denoted as Group-RNTI 1.

A DCI can be used for the user pool scheduling, and UEs belonging to the user pool are configured to commonly receive the DCI, relying on the RNTI; the DCI may be transmitted in the UE-common search space.

In some embodiment of the user pool scheduling, DCI for group scheduling may include active user set to indicate identity of scheduled UEs in the current DCI. This can be indicated via an X-bit bitmap, where a bit value 1 in a position x indicates that UE x (in relative UE ID) is scheduled by the current DCI; a bit value 0 indicates that the UE is not scheduled. If SRS is configured by the group scheduling mode, the activated UEs are configured to transmit SRS on their configured resources. In one example, when X=8, an 8-bit bitmap state of [10011000] indicates that UE (in relative UE ID) 1, 4, 5 are scheduled.

In some embodiment of the user pool scheduling, DCI for group scheduling may include group scheduling mode to configure each of the scheduled UEs to do one of a combination of the following: measure CSI-RS and report CSI; receive PDSCH; receive PDSCH on RS (DMRS) ports; measure CSI using the same RS to report CSI; transmit SRS; transmit SRS and measure CSI-RS to report CSI; receive PDSCH and transmit SRS; or receive PDSCH on RS (DMRS) ports; measure CSI using the same RS to report CSI; and transmit SRS.

In some embodiment of the user pool scheduling, DCI for group scheduling may include RS port allocation for the active UEs to indicate individual UEs to identify RS ports for the signal part and RS ports for the interference part for CSI estimation. This parameter may indicate CSI-RS ports if the UE is configured to measure CSI-RS and report CSI; DMRS ports if the UE is configured to receive PDSCH; or commonly used ports for DMRS and CSI-RS if the UE is configured to do both.

In such embodiments, the parameters including port information indicates a UE of up to U port RS port numbers (e.g., U=2). For this purpose, an X-bit bitmap can be used. When UE x is activated, a bit value 1 in bit position x indicates that UE x may receive two-port RS; a bit value 0 indicates one-port RS. When UE x is not activated, UE x treats this information as not applicable (N/A). Suppose that RS port numbers that can be indicated by the DCI are $p_0$, $p_0+1, \ldots, p_0+N_P-1$, according to the UE-specific RRC configuration. Then, an i-th activated UE may use the following set of antenna ports (where I stands for the total number of activated UEs in this DCI, n(i) is the number of antenna ports scheduled for the i-th activated UE, and n(0)=0):

$$p_0 + \sum_{k=1}^{i} n(k-1), \ldots, p_0 + \sum_{k=1}^{i} n(k-1) + n(i) - 1, i = 1, \ldots, I,$$

where, The i-th activated UE may use the rest of the ports for interference estimation for demodulation and/or CSI estimation, wherein the rest implies those ports not configured to i-th UE from the total number of scheduled ports $$\left( = \sum_{i=1}^{I} n(i) \right).$$

In one example, suppose that N=8 and the state of the active user set bitmap is [10011000]. Further suppose that the DCI contains the following bitmap for RS port allocation [10001000]. Then, UE 1 is allocated with two ports; UE 4 is allocated with 1 port; and UE 5 is allocated with one port. This gives a sum total number of ports $N_P$ being equal to 4. When the RRC configured RS ports are $p_0, p_0+1, \ldots, p_0+7$, all the three UEs (UE 1, UE4 and UE5) will be aware of the first $N_p=4$ ports, i.e., $p_0, P_0+1, p_0+2, p_0+3, p_0+4$ as a set of RS ports used in the scheduled slot. UE 1 is configured to use the first two antenna ports, i.e., $p_0, p_0+1$ for measuring the signal part and the rest of the antenna ports, i.e., $p_0+2, p_0+3, P_0+4$ for measuring the interference part. UE 4 is configured to use the first antenna port after the previously allocated two antenna ports (to UE 1), i.e., $p_0+2$, for measuring the signal part and the rest of the antenna ports, $p_0$, $p_0+1, p_0+3, p_0+4$ for measuring the interference part. UE 5 is configured to use the first two antenna ports after the previously allocated three antenna ports (to UEs with smaller indices, i.e., UEs 1 and 4), i.e., $p_0+3, p_0+4$, for measuring the signal part and the rest of the antenna ports $p_0$, $p_0+1, p_0+2$ for measuring the interference part as illustrated in FIG. 11.

Figure 11:
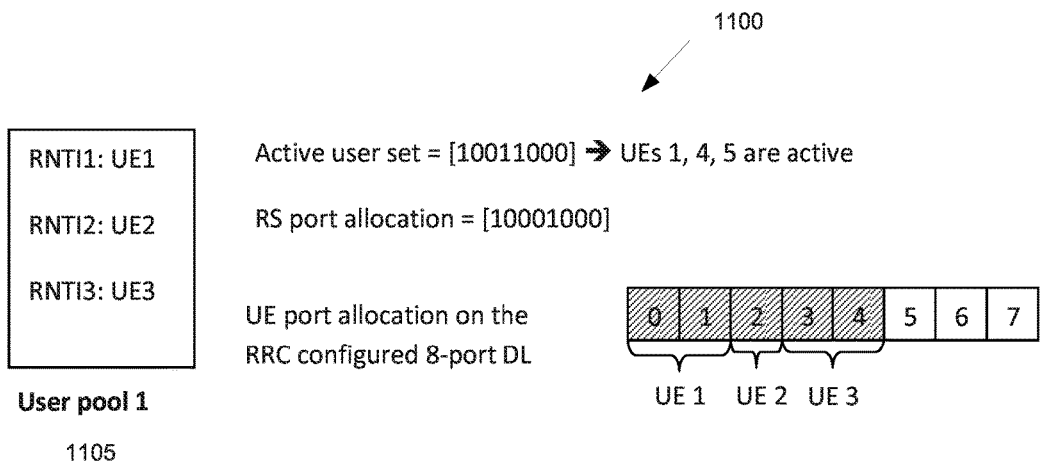
FIG. 11 illustrates an example downlink channel information (DCI) signaling for UE group scheduling according to embodiments of the present disclosure.

FIG. 11 1100 illustrates an example downlink channel information (DCI) signaling for UE group scheduling according to embodiments of the present disclosure. An embodiment of the downlink channel information (DCI) signaling for UE group scheduling shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure. As shown in FIG. 11, a user pool 1 1105 includes a plurality of RNTIs for each of UEs in the user pool 1 1105.

In some embodiments, active user set and RS port allocation are jointly indicated, with allocating w states per UE in the joint bit field. In one example, for each UE, the following states are indicated: state 0: the UE is not scheduled; state 1: the UE is scheduled, on a single antenna port; and state 2: the UE is scheduled, on two antenna ports. In another example, for each UE, the following states are indicated: state 0: the UE is not scheduled; state 1: the UE is scheduled, on a single antenna port, with a first RS scrambling initialization parameter; state 2: the UE is scheduled, on a single antenna port, with a second RS scrambling initialization parameter; and state 3: the UE is scheduled on two antenna ports.

The subsequent UE scheme to determine the allocated antenna port indices can be performed as described in the aforementioned embodiments. When the configured states for RS port allocation is [20012000], and the RS port allocation states are mapped according to the aforementioned embodiments, the allocated RS ports (for the signal part) to a UE 1, a UE 2 and a UE 3 are respectively equal to $\{p_0, p_0+1\}, \{p_0+2\}$ and $\{p_0+3, p_0+4\}$ as illustrated in FIG. 12.

Figure 12:
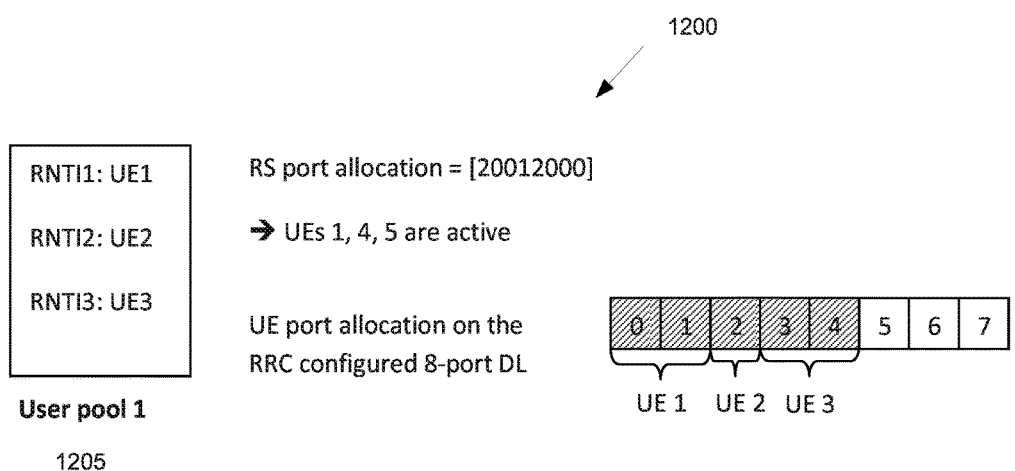
FIG. 12 illustrates another example DCI signaling for UE group scheduling according to embodiments of the present disclosure.

FIG. 12 1200 illustrates another example DCI signaling for UE group scheduling according to embodiments of the present disclosure. An embodiment of the DCI signaling for UE group scheduling shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure. As shown in FIG. 12, a user pool 1 1105 includes a plurality of RNTIs for each of UEs in the user pool 1 1205.

Figure 13:
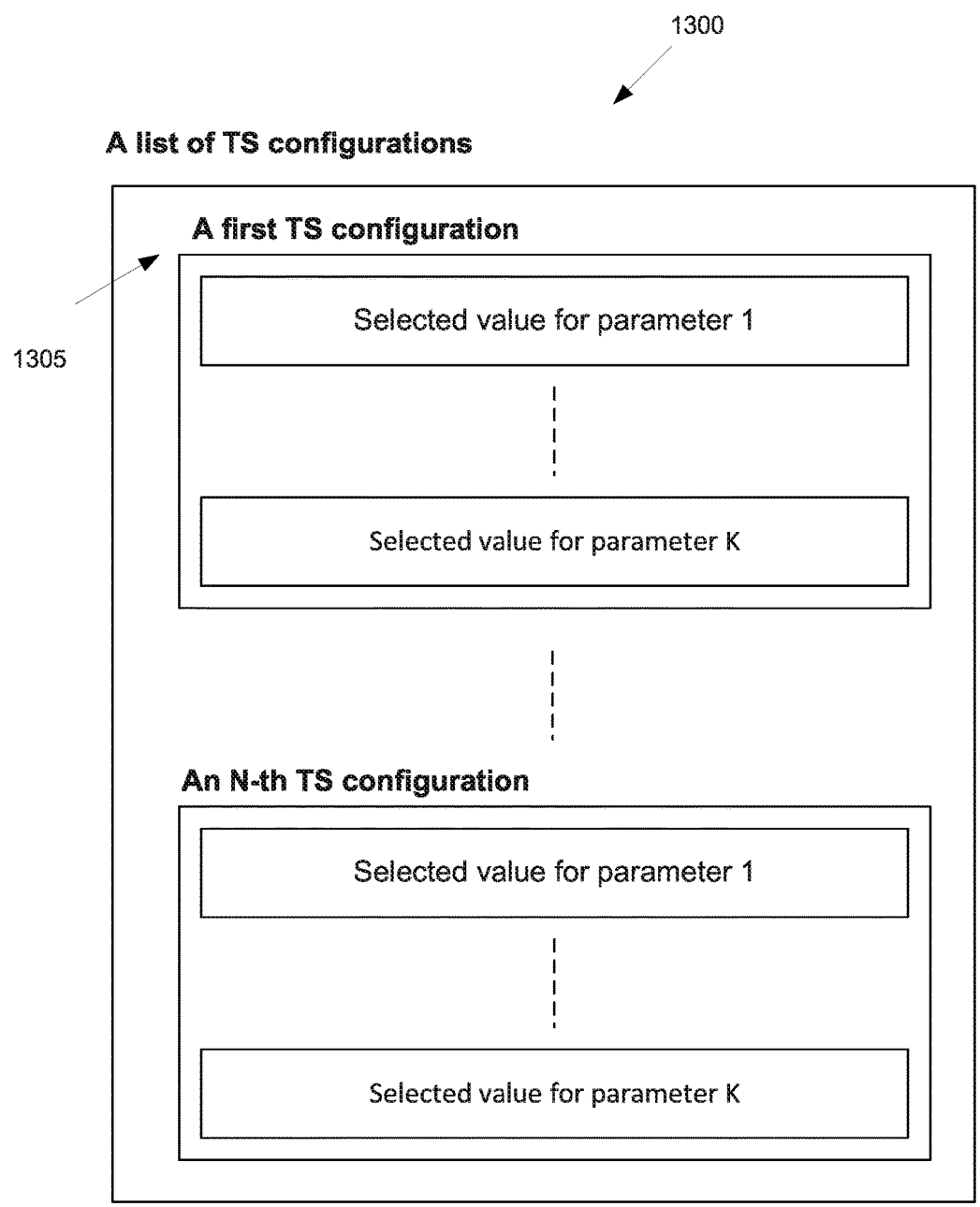
FIG. 13 illustrates an example a list of N transmission scheme (TS) configurations according to embodiments of the present disclosure.

FIG. 13 1300 illustrates an example a list of N transmission scheme (TS) configurations according to embodiments of the present disclosure. An embodiment of the list of N transmission scheme (TS) configurations shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure. As shown in FIG. 13, a list of TS configurations 1300 include a plurality of TS configuration 1305 (e.g., a first TS configuration to an n-th TS configuration).

For enhancing flexibility of eNB scheduling and data transmission configurations, DCI can be designed in a modularized manner. A UE is higher-layer (RRC) configured with specific values for a group of parameters that determines UE's behavior on DL PHY data reception, which also determines the contents and a total payload in the DCI that UE needs to decode for DL reception in a specific TTI. The contents and total payload of the DCI can be UE-specifically configured in this manner. To facilitate UE to receive one of multiple transmission schemes (e.g., fallback and normal transmission schemes) for a DL reception, an eNB may configure multiple groups of the parameter values. For example, a UE is configured with a list of N groups of parameters (transmission scheme configurations) including: a first group of parameters (a first transmission scheme configuration) to construct a first DCI contents used for scheduling a first transmission scheme. The DCI constructed with the first DCI contents is called a first DCI; and a second group of parameters (a second transmission scheme configuration) to construct a second DCI contents (used for scheduling a second transmission scheme). The DCI constructed with the second DCI contents is called a second DCI.

In some embodiments, a UE is configured to assume default set of parameters for fallback DL transmission schemes while the UE is explicitly configured with a set of parameter values for a normal DL transmission schemes. In such embodiments, N=1 TS configuration is signaled for the normal scheme. In some embodiments, N=2 TS configurations are signaled to a UE, one for the normal and the other for the fallback transmission schemes. In such embodiments, an integer number of N configurations are signaled to a UE. In such embodiments, the UE is configured to decode one or more DCIs out of these N candidate DCIs in the UE's DCI search space.

In some embodiments, DL BW super-set (or full BW) can be (UE specifically) higher-layer configured for UE to construct DCI contents for a particular DCI. In such embodiments, information on the BW super-set the UE can be scheduled for the DL receptions (can be in terms of RBGs) and/or the RA field is interpreted according to the configured value of this field; the size of RA field changes dependent upon this field.

In some embodiments, UL BW super-set (or full BW) can be (UE specifically) higher-layer configured for UE to construct DCI contents for a particular DCI. In such embodiments, information on the BW super-set the UE can be scheduled for the UL transmissions (can be in terms of RBGs) and/or the RA field is interpreted according to the configured value of this field; the size of RA field changes dependent upon this field.

In some embodiments, resource allocation (RA) can be (UE specifically) higher-layer configured for UE to construct DCI contents for a particular DCI. In such embodiments, the RA may include at least two of a first RA type . . . RBG-based (similar to RA type 0 in LTE), a second RA type . . . VRB based (similar to RA type 1 in LTE), or a third RA type . . . Contiguous allocation (similar to RA type 2 in LTE). In such embodiments, the number of bits for RA in DCI may be different for different RA types.

In some embodiments, scheduling granularity can be (UE specifically) higher-layer configured for UE to construct DCI contents for a particular DCI. In such embodiments, the scheduling granularity includes a wideband (e.g., he UE can only be scheduled with the configured full bandwidth for a TTI. If this is configured, RA field size becomes 0 and the UE should assume the full bandwidth is allocated for the TTI) and/or a partial bandwidth (e.g., if this is configured, RA field size is determined dependent upon the configured RA type).

In some embodiments, resource allocation can be (UE specifically) higher-layer configured for UE to construct DCI contents for a particular DCI. In such embodiments, at least two of wideband (0 bits for RA), a first RA type . . . RBG-based (similar to RA type 0 in LTE), a $2^{nd}$ RA type . . . VRB based (similar to RA type 1 in LTE), or a $2^{nd}$ RA type . . . contiguous allocation (similar to RA type 2 in LTE)} may be selected.

In some embodiments, a transmission technique (in terms of precoding method (and also CW-to-layer mapping in one alternative)) can be (UE specifically) higher-layer configured for UE to construct DCI contents for a particular DCI. In such embodiments, the transmission technique may include a first transmission technique and/or a second transmission technique.

In some embodiments, a precoding granularity in frequency domain can be (UE specifically) higher-layer configured for UE to construct DCI contents for a particular DCI. In such embodiments. In such embodiments, at least one of a wideband (e.g., the UE may assume that a same precoder has been used across the allocated BWs in the TTI.) or an X-PRB based (e.g., the UE may not assume that a same precoder has been used across different group of x-PRBs in the TTI. The value of X can be fixed (e.g., 1 or the same as RBG size), or configured by RRC, is selected.

In some embodiments, a precoding granularity in time domain can be (UE specifically) higher-layer configured for UE to construct DCI contents for a particular DCI. In such embodiments, at least two of each slot based, across scheduled slots, or a unit of X-slots (e.g., the UE may not assume that a same precoder has been used across different group of x-slots in the TTI. The value of X can be fixed (e.g., 1 or the same as RBG size), or configured by RRC, are selected.

In some embodiments, QCL can be (UE specifically) higher-layer configured for UE to construct DCI contents for a particular DCI. In such embodiments, the QCL may include QCL type 0 that the UE may not assume that DMRS in a TTI is QCL with (1) DMRS in another TTI; and (2) other types of RS. In such embodiments, a configuration may implicitly determine precoding granularity and scheduling granularity—both may be wideband and hence 0 bits for RA field. In such embodiments, the QCL may include QCL type 1 that the UE can be indicated a RS resource or port or beam index (corresponding to e.g., CSI-RS or mobility RS) in the DCI that is QCL with the DMRS in the current TTI in a set of channel parameters. In such embodiments, a set of channel parameters can be any combination of delay, Doppler, angle of arrival and other QCL parameters. This combination can be explicitly indicated.

In some embodiments, a length of subframe (or TTI) can be (UE specifically) higher-layer configured for UE to construct DCI contents for a particular DCI. In such embodiments, the length of subframe may be determined in terms of a number of OFDM symbols or in terms of sec or in terms of time slots.

In some embodiments, a maximum Modulation order can be (UE specifically) higher-layer configured for UE to construct DCI contents for a particular DCI. In such embodiments, the maximum modulation order that may be scheduled for the UE. The UE may be configured to use a different MCS table, based on the value configured in this field.

In some embodiments, aperiodic CSI-RS request on/off can be (UE specifically) higher-layer configured for UE to construct DCI contents for a particular DCI. In such embodiments, when "off" is configured, 0 bits are used for this field. In such embodiments, when "on" is configured, u bits are used for this field. When the UE is triggered with aperiodic CSI-RS, the UE reports aperiodic CSI on subframe n+k+p, is the same as the subframe UE is configured to report the HARQ-ACK. In this case, the HARQ-ACK and aperiodic CSI are multiplexed on a PUSCH.

In some embodiments, aperiodic CSI-RS resource candidates (e.g., a list of CSI-RS resource symbol/frequency/antenna port and CQI types (a first resource, a second resource, etc.)) can be (UE specifically) higher-layer configured for UE to construct DCI contents for a particular DCI. In such embodiments, a specific aperiodic CSI-RS resource offset is indicated in a DCI.

In some embodiments, aperiodic SRS request on/off can be (UE specifically) higher-layer configured for UE to construct DCI contents for a particular DCI. In such embodiments, when "off" is configured, 0 bits are used for this field. When "on" is configured, v bits are used for this field.

In some embodiments, aperiodic SRS resource candidates (e.g., a list of time/frequency/subband index/comb/SRS sequence (a first resource, a second resource, etc.)) can be (UE specifically) higher-layer configured for UE to construct DCI contents for a particular DCI. In such embodiments, a specific SRS resource is indicated in a DCI.

In some embodiments, HARQ-ACK time offset candidates (e.g., a list of a first offset, a second offset, etc.) can be (UE specifically) higher-layer configured for UE to construct DCI contents for a particular DCI. In such embodiments, the number of configured offsets determines the length of this field in the DCI. If the list has only one offset, the offset field in the DCI has zero bit, and the offset is always the same as the single configured offset value. In such embodiments, a specific HARQ-ACK time offset is indicated in a DCI, so that the UE feeds back HARQ-ACK in subframe n+k+p, wherein n is the scheduled subframe by the DCI, k is a static offset, p is the offset indicated by the DCI, which can be one of the $1^{st}$, $2^{nd}$, . . . , offsets.

In some embodiments, HARQ-ACK resource offset candidates (e.g., a list of a first offset, a second offset, etc.) can be (UE specifically) higher-layer configured for UE to construct DCI contents for a particular DCI. In such embodiments, the number of configured offsets determines the length of this field in the DCI. In such embodiments, the number of configured offsets determines the length of this field in the DCI. If the list has only one offset, the offset field in the DCI has zero bit, and the offset is always the same as the single configured offset value. In such embodiments, a specific HARQ-ACK resource is indicated in a DCI, so that the UE feeds back HARQ-ACK on resource q+r, wherein q is the semi-statically configure HARQ-ACK resource; r is the offset indicated by the DCI, which can be one of the $1^{st}$, $2^{nd}$, . . . , offsets.

In some embodiments, PDSCH/PUSCH scheduling timing relationship candidates can be (UE specifically) higher-layer configured for UE to construct DCI contents for a particular DCI. In such embodiments, one UE-specific value is determined. In such embodiments, a specific offset (e.g., a list of a first offset, a second offset, etc.) is indicated in a DCI.

In some embodiments, configured component carriers (e.g., a list of a first carrier ID, a second carrier ID, etc.) can be (UE specifically) higher-layer configured for UE to construct DCI contents for a particular DCI. In such embodiments, this information determines the size of CIF field.

In some embodiments, DCI multiplicity ($N_{mul}$) (e.g., choice of {1, 2, . . . }) can be (UE specifically) higher-layer configured for UE to construct DCI contents for a particular DCI. In such embodiments, a UE can receive up to $N_{mul}$ DCI of the same contents defined by these higher-layer parameters. This can be useful for supporting non-coherent JT.

In some embodiments, antenna ports and number of layers (and scrambling identity) can be (UE specifically) higher-layer configured for UE to construct DCI contents for a particular DCI. In such embodiments, at least one of not indicated in DCI (0 bits for this field), up to 1 layer transmission (x bits for this field), up to 2 layer transmissions (y bits for this field), up to 4 layer transmissions (z bits for this field), or up to 8 layer transmissions (w bits for this field) is selected. In such embodiments, for up to L layer transmissions, a set of antenna port numbers that can be configured in the DCI can also be configured. For example, for up to 1-layer transmission, a UE can be configured with a choice of antenna ports {P0, P0+1}, {P0+2, P0+3} when the UE can be configured with two candidate antenna ports. Similar examples can be constructed if the choice allows UE to be configured with other numbers of candidate antenna ports and other numbers of layers. In one embodiment, the UE can be configured with a list of multiple choices of antenna ports. For example, the UE is configured with (1) {P0, P0+1} and (2) {P0+2, P0+3}. In this case, the UE is further configured with another field (say, field X) in the DCI, which indicates a set of antenna ports to be used for decoding this field. For example, if field X has a first state, the UE decodes this field with {P0, P0+1}; if field X has a second state, the UE decodes with {P0+2, P0+3}. Similar examples can be constructed if the choice allows UE to be configured with other numbers of candidate antenna ports and other numbers of layers.

In some embodiments, DMRS mapping can be (UE specifically) higher-layer configured for UE to construct DCI contents for a particular DCI. In such embodiments, at least one of mapping pattern 1 (DMRS is mapped on only a single OFDM symbol on an early part of the TTI) or mapping pattern 2 (DMRS is mapped on multiple OFDM symbols (early and later parts of the TTI) to facilitate high-Doppler estimation) is selected.

In some embodiments, some of those parameters aforementioned are not indicated in the RRC configuration can be dynamically indicated to a UE in a DCI. In addition, the RRC configuration may also determine the possible values for each parameter that can be indicated in a DCI. The resulting DCI payload size is flexibly determined at least partly by a product of number of states of the parameters that are not pre-determined in the RRC.

In one example, for a first DCI, the RRC parameter values are configured such that: parameter 1 has a single fixed value; parameter 2 has $N_1=2$ candidate values to be indicated via DCI; parameter 3 has $N_2=4$ candidate values to be indicated via DCI; and/or parameter 4 has $N_3=3$ candidate values to be indicated via DCI. In such example, the number of states to be indicated by the first DCI is 1×2×4×3=24, and the DCI payload is determined as ceiling($\log_2(24)$)+S bits, wherein S bits represent a common portion of the total DCI payloads. The UE assumes that these parameter values are sequentially mapped to the 32 states built by the ceiling($\log_2(24)$)=5 bits. The values of those parameters listed earlier in the parameter list (or with the smallest parameter number/index) will be mapped to the MSB side (or alternatively to the LSB side). For example, suppose that state is decimal representation of the 5 bits. Then UE finds a value of Parameter 2 by calculating mod(state, $N_1$). If the result is 0, a first value; if 1, a second value. The value of parameter 3 is determined by mod(floor(state/$N_1$),$N_2$). If the result is 0, 1, 2, 3, then the indicated value is a first, a second, a third and a fourth value respectively. The value of parameter 4 is determined by mod(floor(state/$N_1*N_2$),$N_3$). If the result is 0, 1, 2, and then the indicated value is a first, a second and a third value, respectively.

The information aforementioned regarding the precoding granularity can be indicated according to the following alternatives: the indicated information is applicable only for the indicated DMRS ports; the indicated information is applicable for all the DMRS ports in a super-set of DMRS ports. Here, the super-set of DMRS ports may correspond to the set of DMRS ports that can be indicated by the DMRS port indicator field in the DCI; the super set of DMRS ports may be higher-layer (RRC) configured; or separate indication is provided for the indicated DMRS ports and for the interference DMRS ports. The interference DMRS ports correspond to a complement of the set of indicated DMRS ports, wherein the complement is taken towards the super set of DMRS ports.

Figure 14:
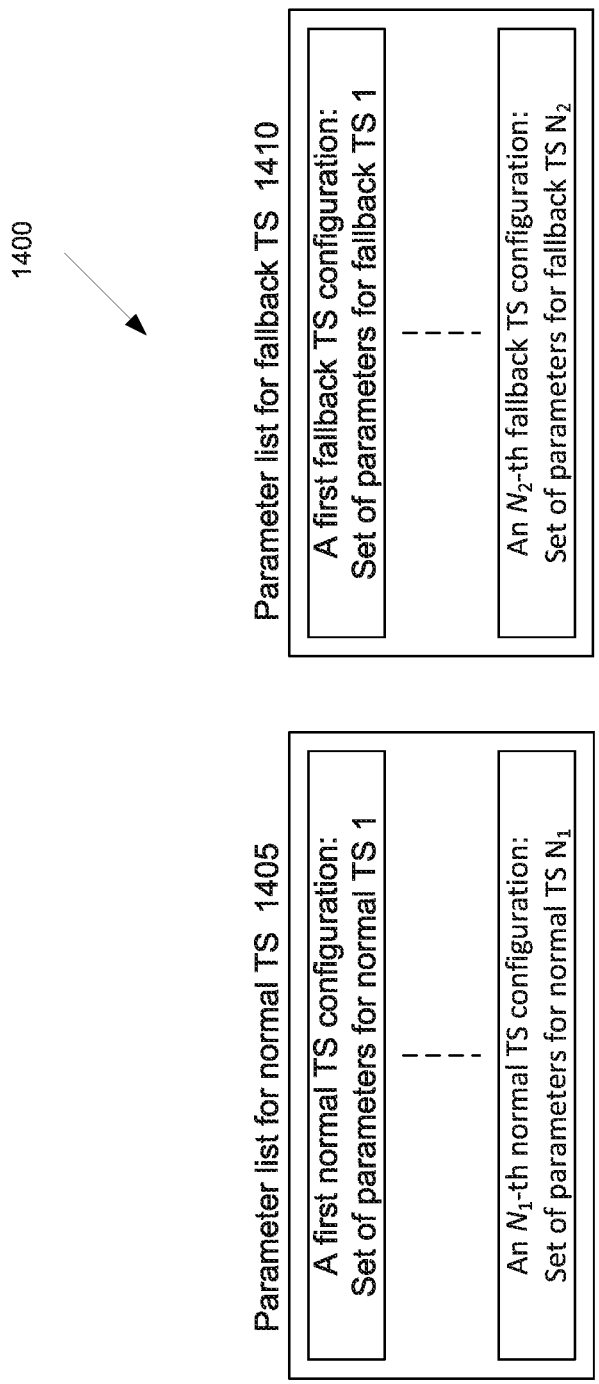
FIG. 14 illustrates an example parameter list configuration for normal-type and fallback-type transmission schemes according to embodiments of the present disclosure.

FIG. 14 1400 illustrates an example parameter list configuration for normal-type and fallback-type transmission schemes according to embodiments of the present disclosure. An embodiment of the parameter list configuration for normal-type and fallback-type transmission schemes shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure. As shown in FIG. 14, a parameter list for normal TS 1405 includes a plurality of normal TS configuration (e.g., a first normal TS configuration to n-th normal TS configuration) and a parameter list for fallback TS 1410 includes a plurality of fallback TS configuration (e.g., a first fallback TS configuration to n-th fallback TS configuration)

In legacy LTE systems, transmission schemes and transmission modes are configured by an RRC. When an eNB switches a transmission mode for a UE using the RRC configuration, there exists a time duration for which the eNB does not know what transmission mode the UE assumes for the current UL/DL reception. This uncertainty is because there is no certain ways that the eNB can figure out if and when the UE has successfully decoded the RRC configuration message in the RRC layer. This uncertainty during the switching time may adversely have impacted the system throughput. It would be nice if RRC intervention is minimized for TM/TS switching.

As in legacy LTE system, the UE can be configured to decode at least one DCI in each TTI (slot/subframe), whose payload size (number of information bits in a DCI) is selected from C candidate payload sizes (for NR-PDSCH reception). In one example, a first payload size corresponds to a normal DL transmission scheme and a second payload size corresponds to a fallback DL transmission scheme, wherein C≥2. To allow for dynamic switching of transmission schemes without RRC intervention, the UE may be configured with: a list of $N_1$ parameter groups (or normal TS configurations) to construct $N_1$ DCI contents for $N_1$ candidate normal-type DL transmission schemes; and/or a list of $N_2$ parameter groups (or fallback TS configurations) to construct $N_2$ DCI contents for $N_2$ candidate fallback-type DL transmission schemes.

On each TTI to receive NR-PDCCH, a UE is configured to receive NR-PDSCH transmitted with assuming one of those candidate transmission schemes. FIG. 14 illustrates a configure parameter lists for normal or fallback transmission schemes.

Figure 15:
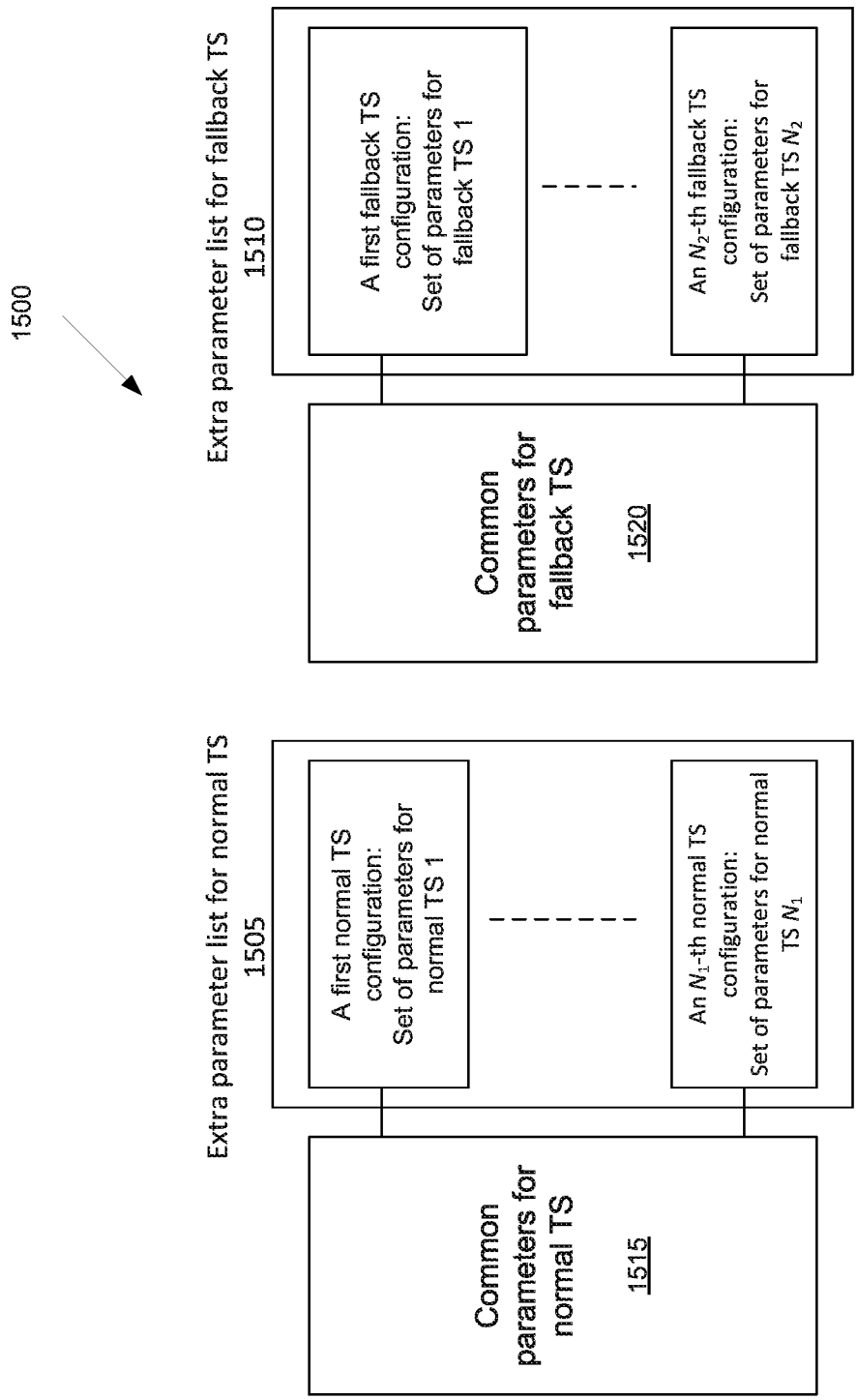
FIG. 15 illustrates an example parameter list configuration for normal-type and fallback-type transmission schemes according to embodiments of the present disclosure.

FIG. 15 1500 illustrates an example parameter list configuration for normal-type and fallback-type transmission schemes according to embodiments of the present disclosure. An embodiment of the parameter list configuration for normal-type and fallback-type transmission schemes shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure. As shown in FIG. 1500, the parameter list configuration 1500 comprises an extra parameter list for normal TS 1505, an extra parameter list for fallback TS 1510, common parameters for normal TS 1515, and common parameters for fallback TS 1520.

In some embodiments, a UE may be configured with common parameters for all the $N_1$ normal-type DL transmission schemes. In such embodiment, a list of $N_1$ extra parameter groups (sets) for the remaining aspects of the $N_1$ DCI contents for $N_1$ candidate normal-type DL transmission schemes is determined. In some embodiment, a UE may be configured with common parameters for all the $N_2$ fallback-type DL transmission schemes. In such embodiments, a list of $N_2$ extra parameter groups (sets) for the remaining aspects of the $N_2$ DCI contents for $N_2$ candidate fallback-type DL transmission schemes is determined. FIG. 15 illustrates a configure parameter lists for normal or fallback transmission schemes, according to these embodiments of the current invention.

These $N_1$ and $N_2$ members (or parameter groups) of the corresponding list in FIG. 15 are indexed with integers $\{0, \ldots, N_x-1\}$ or $\{1, \ldots, N_x\}$ (wherein x=1, 2). In some embodiments, these integers are explicitly assigned as identity of these members. In this case, the UE is configured to blindly decode at least one DCI assuming the two candidate DCI payload sizes for DL NR-PDSCH reception; one size for the normal-type transmission schemes and another size for the fallback-type transmission schemes. In one example, $N_1$ is an integer >1, while $N_2$=1. In another example, both numbers are integers >1. The payload sizes corresponding to these $N_x$ different candidate DL transmission schemes of one type can be different as different features are turned on for these different transmission schemes. In order for the UE to decode different variants of the DCIs with different sizes, the UE assumes at most two DCI payload sizes for decoding DCIs for the DL transmission schemes, for example, one for the normal-type transmission schemes, and another for the fallback-type transmission schemes.

Figure 16:
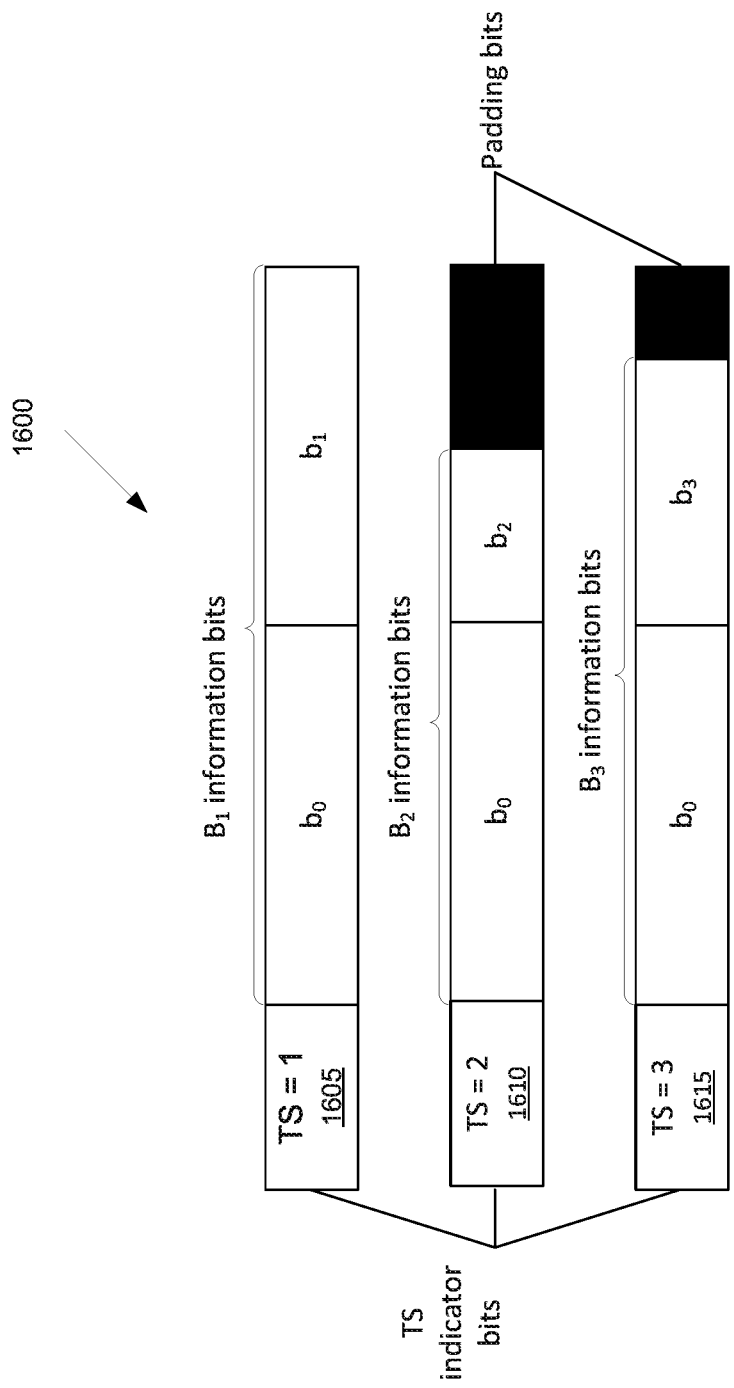
FIG. 16 illustrates an example payload construction for dynamic switching of transmission schemes according to embodiments of the present disclosure.

FIG. 16 1600 illustrates an example payload construction for dynamic switching of transmission schemes according to embodiments of the present disclosure. An embodiment of the payload construction for dynamic switching of transmission schemes shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure. As shown in FIG. 16, the payload construction 1600 comprises a TS=1 1605, a TS=2 1610, and a TS=3 1615.

FIG. 16 1600 illustrates a payload construction to allow for dynamic switching of transmission schemes of each of normal or fallback types. In the FIG. 1600, the DCI payload comprises TS indicator bits (2 bits) and other information bits ($B_1$ bits). Depending on the state of the TS indicator bits, the UE interprets the rest of the bits differently. When the TS=1 1605, all the remaining $B_1$ information bits indicate information to receive the corresponding NR-PDSCH for the TS. When the TS=2 1610 or 3 1615, the number of information bits necessary to correctly receive the corresponding NR-PDSCH is smaller than $B_1$; the rest of the bits are padded with either 0 or 1. In one embodiment, the $B_1$, $B_2$ and $B_3$ information bits comprise a common portion of $b_0$ bits that correspond to common parameters for a TS of a certain type; and the rest of the bits are different. Such embodiment is in accordance with the embodiments related to FIG. 15.

In some embodiments, the DCI payload size (in terms of bits) for one type of transmission schemes is determined as a sum of maximum of the DCI payload sizes corresponding to those candidate transmission schemes and an integer, say M. The integer is determined as $M_x = \text{ceil}(\log 2(N_x))$, and the codepoint corresponding to the $M_x$ number of bits is used for indicating a transmission scheme, selected from the $N_x$ transmission schemes. The rest of the DCI contents are differently interpreted dependent upon the state of the codepoint. In one example, a UE is configured with $N_1 = 3$ candidate normal-type transmission schemes, which corresponds to three different DCI payload sizes, $B_1$, $B_2$ and $B_3$ information bits. In this case, the UE may assume the payload size of at least $\text{ceil}(\log 2(3)) + \max\{B_1, B_2, B_3\}$. When $\max\{B_1, B_2, B_3\} = B_1$, the payload size for a DCI for normal transmission scheme becomes $(2 + B_1)$. The UE is configured to read the codepoint (TS indicator bits) to figure out how to interpret the rest of the payloads. When the codepoint indicates a transmission scheme that needs a smaller payload than $B_1$, say $B_2$, the remaining $(B_1 - B_2)$ information bits are padded with zero (or one).

Figure 17:
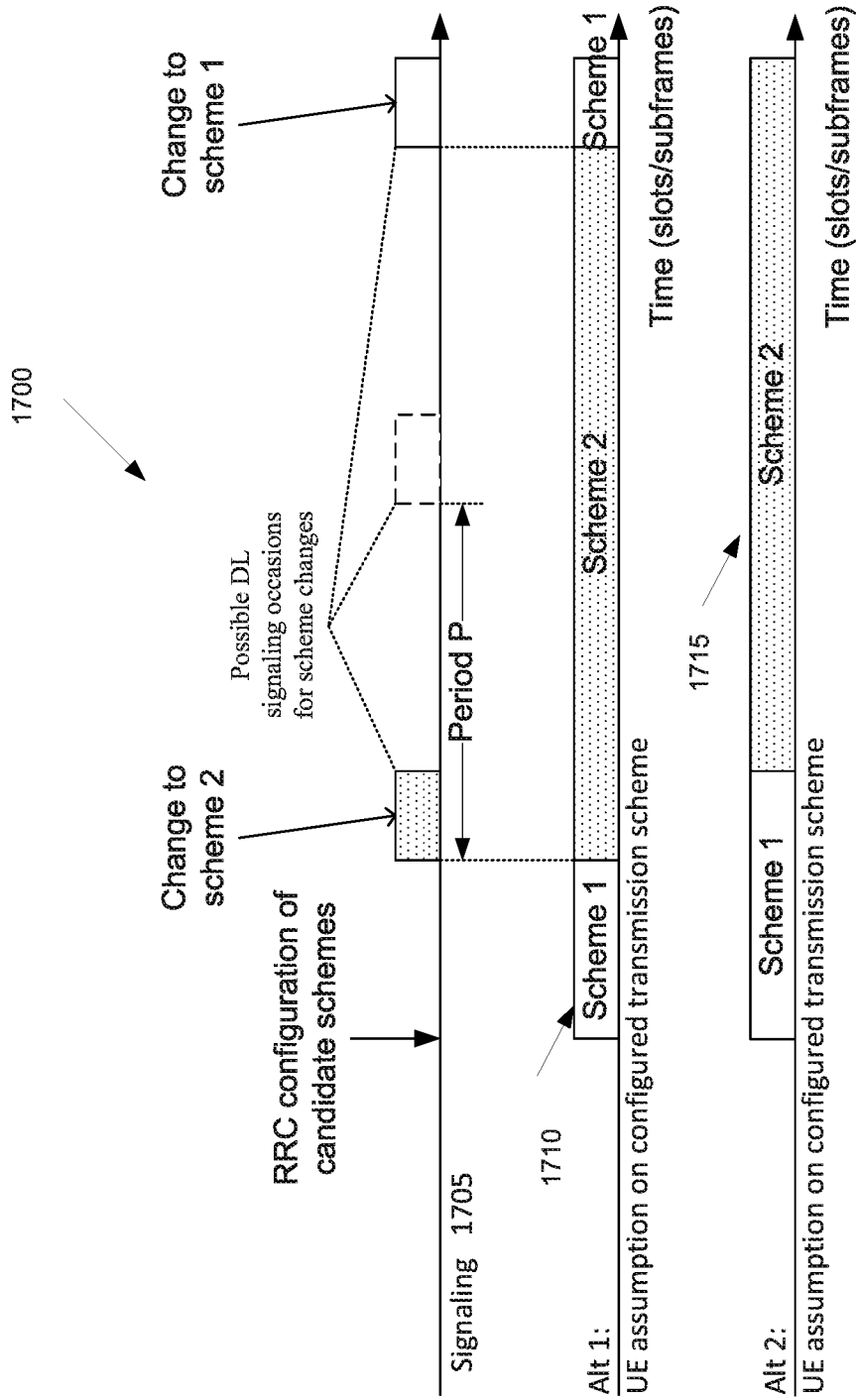
FIG. 17 illustrates an example dynamic switching of transmission schemes according to embodiments of the present disclosure.

FIG. 17 1700 illustrates an example dynamic switching of transmission schemes according to embodiments of the present disclosure. An embodiment of the dynamic switching of transmission schemes shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure. As shown in FIG. 17, the dynamic switching if transmission schemes 1700 comprises a signaling 1705, a scheme 1 1710, and a scheme 2 1715.

In some embodiments, the UE is indicated by a separate DL signaling for scheme changes: a selected normal transmission scheme and/or a selected fallback transmission scheme, which are respectively chosen from the candidate normal transmission schemes and the candidate fallback transmission schemes configured by RRC. In one example, this RRC configuration is included in RRC-Connection message. In another example, this RRC configuration is included in RRC-reconfiguration message. The DL signaling conveys at least $M_1 + M_2$ information bits, wherein $M_x = \text{ceil}(\log 2(N_x))$, and the codepoint corresponding to the $M_x$ number of bits is used for indicating a transmission scheme, selected from the $N_x$ RRC configured transmission schemes.

The separate DL signaling for scheme changes is configured to be present in periodically recurring time instances; with a period P time slots (or subframes), wherein P is an integer. When the UE decodes the DL signaling, the UE is configured to update the payload sizes for the normal and/or fallback transmission schemes and the corresponding payloads. In one example, the separate DL signaling is a specially designed DCI to at least convey the selected transmission methods. In another example, the separate DL signaling is a specially designed MAC CE to at least convey the selected transmission methods. The separate DL signaling for scheme changes can be transmitted as a separate DCI, and the separate can be transmitted in the same time slot as the DCIs for DL transmission schemes.

The separate DCI can be distinguished from DL/UL scheduling DCIs by the UE. In one example, a separate RNTI is assigned for the separate DCI. In another example, a different payload size is allocated to the separate DCI from the scheduling DCIs. In yet another example, a separate search space is provided for the separate DCI, which is differently configured from the search space for the scheduling DCIs.

In some embodiments, the UE is configured to decode the separate DCI first, to determine the payload size of the DCIs for DL transmission schemes in the same time slot as illustrated in FIG. 17 (e.g., scheme 1710).

In some embodiments, the UE is configured to use the old payload sizes to decode the DCIs for DL transmission schemes during the same slot/subframe as the separate DL signaling for scheme changes; from the next opportunity (e.g., subframe/time slot), the UE is configured to use the new payload sizes as illustrated in FIG. 17 (e.g., scheme 2 1715).

Suppose that the UE is configured with $N_1 = 3$ candidate normal-type transmission schemes, which corresponds to three different DCI payload sizes, $B_1$, $B_2$ and $B_3$ information bits. Before receiving any other indication to change the payload size for the normal-type transmission schemes, the UE is configured to assume the default payload size corresponding to a default normal transmission scheme, which is the first in the list, i.e., $B_1$ information bits. Once UE receives an indication to change to transmission scheme i=2 for the normal-type, the UE changes its payload-size assumption to decode normal-type DCI to $B_2$ and interpret the DCI bits accordingly (scheme 2 1715 in FIG. 17).

Figure 18:
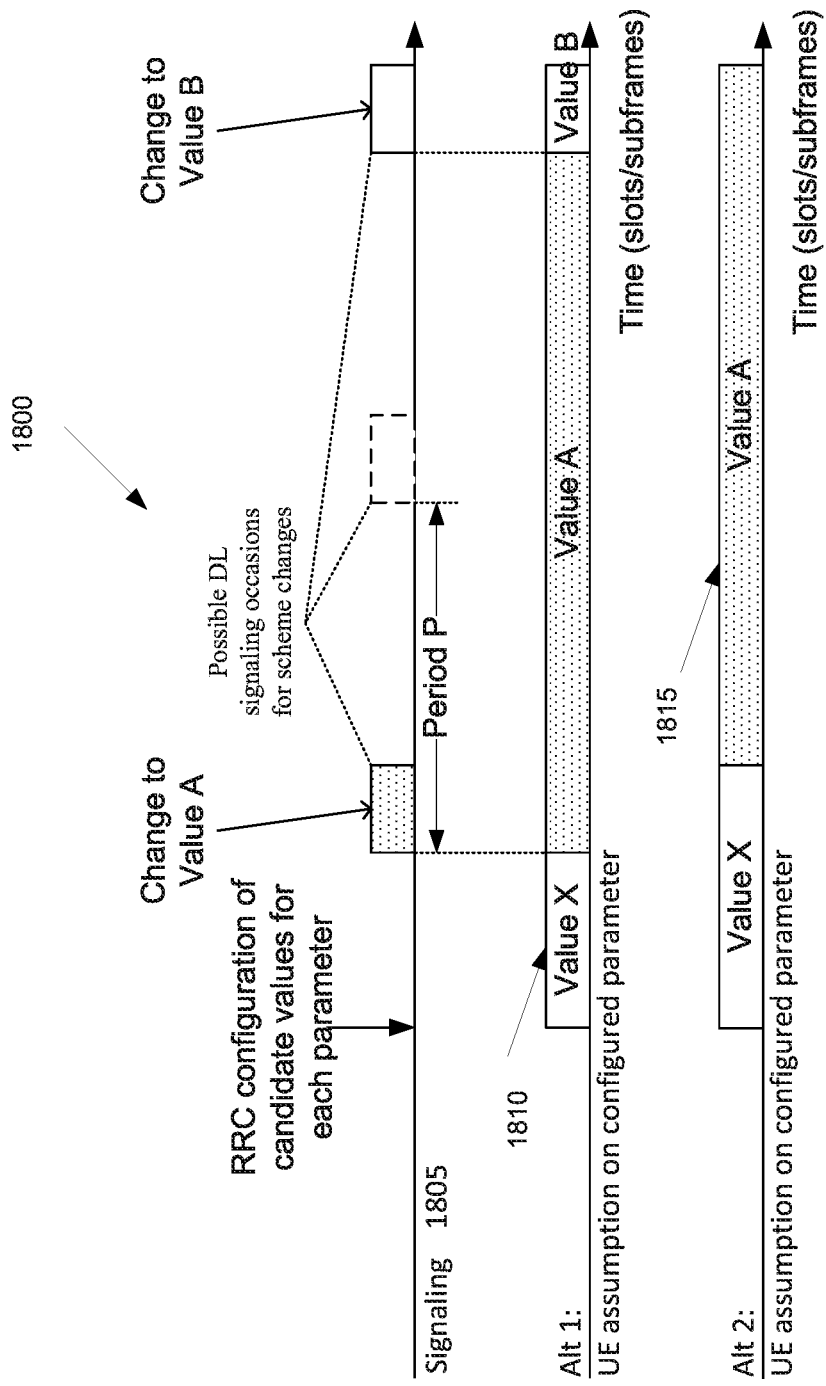
FIG. 18 illustrates an example dynamic change of configuration parameters according to embodiments of the present disclosure.

FIG. 18 1800 illustrates an example dynamic change of configuration parameters according to embodiments of the present disclosure. An embodiment of the dynamic change of configuration parameters shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure. As shown in FIG. 18, the dynamic change of configuration parameters 1800 comprises a signaling 1805, a value X 1810, and a value A 1815.

In some embodiments, a UE is RRC configured with candidate value sets for a number of parameters. For example, the UE is RRC configured with candidate values {A, B, C} for a first parameter; and candidate values {1, 2} for a second parameter. This RRC configuration can be RRC connection message or RRC reconfiguration message. In one example, the first of the candidate value set is default value for each parameter. Unless configured otherwise, the UE may assume the default values for the parameter (denoted as Value X 1810 in FIG. 18). The parameter value can change in designated time instances by separate DL signaling. The designated time instances can be periodically recurring, e.g., with a period P time slots (or subframes), wherein P is an integer. When the UE decodes the signaling, the UE is configured to update the parameter values. The parameters are for example, DCI contents, CSI-RS configuration, CSI reporting configuration, Beam-RSRP reporting configuration, etc.

In some embodiments, the separate DL signaling is a specially designed DCI to convey the selected parameter values at least one of the number of parameters. In some embodiments, the separate DL signaling is a specially designed MAC CE. The separate DL signaling for parameter changes can be transmitted as a separate DCI, and the separate DCI can be transmitted in the same time slot as the DCIs for DL transmission schemes.

In some embodiments, the UE is configured to decode the separate DCI first, to determine the parameter values that are used to interpret the DCIs for DL transmission schemes in the same time slot as illustrated in FIG. 18 (e.g., Alt 1)

In some embodiments, the UE is configured to use the old parameter value to decode the DCIs for DL transmission schemes during the same slot/subframe as the separate DL signaling for scheme changes; from the next opportunity (e.g., subframe/time slot), the UE is configured to use the new parameter values as illustrated in FIG. 18 (e.g., Alt 2)

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
    a transceiver configured to receive, from a base station (BS):
        a downlink signal including user pool scheduling information,
        a dynamic downlink control signal including sounding reference signal (SRS) resource and configuration information based on the user pool scheduling information, and
        downlink channel information (DCI) in accordance with a radio network temporary identification (RNTI) over a UE-common search space of the dynamic downlink control signal based on the user pool scheduling information, wherein the UE is included in a user pool group determined by the user pool scheduling information; and
    at least one processor configured to:
        determine the SRS resource and configuration information included in the user pool scheduling information received by the dynamic downlink control signal, and
        determine the DCI based on the user pool group determined by the user pool scheduling information,
    wherein the transceiver is further configured to transmit, to the BS, SRS based on the SRS resource and configuration information included in the user pool scheduling information.

2. The UE of claim 1, wherein:
    the transceiver is further configured to receive the dynamic downlink control signal including channel state information-reference signal (CSI-RS) resource and configuration information based on user pool scheduling information;
    the at least one processor is further configured to determine the CSI-RS resource and configuration information included in the user pool scheduling information; and
    the transceiver is further configured to transmit, to the BS, CSI based on the CSI-RS resource and configuration information included in the user pool scheduling information received from the BS.

3. The UE of claim 1, wherein:
    the transceiver is further configured to receive the dynamic downlink control signal including physical uplink control channel (PUCCH) resource and configuration information based on user pool scheduling information;
    the at least one processor is further configured to determine the PUCCH resource and configuration information included in the user pool scheduling information; and
    wherein, the transceiver is further configured to transmit, to the BS, channel quality information (CQI) based on the PUCCH resource and configuration information included in the user pool scheduling information received from the BS.

4. The UE of claim 1, wherein the DCI includes active user set information indicating identity of each of scheduled UEs in the user pool group, the active user set information comprising bitmap information that indicate the identity of each of the scheduled UEs.

5. The UE of claim 1, wherein the DCI includes a group scheduling mode indicating a configuration of each of scheduled UEs in the user pool group, the group scheduling mode comprises at least one of measurement, reception, or transmission information of at least one of uplink or downlink signal between the BS and each of the scheduled UEs included in the user pool group.

6. The UE of claim 1, wherein the DCI includes reference signal (RS) allocation information for at least one active UE of a plurality of UEs included in the user pool group, the RS allocation information comprising at least one of a first RS port for a signal part or a second RS port for interference part in accordance with CSI estimation.

7. The UE of claim 1, wherein the user pool scheduling information includes information identifying each of a plurality of UEs, including the UE, that are included in a UE pool scheduled by the user pool scheduling information.

8. A base station (BS) in a wireless communication system, the BS comprising:
    at least one processor configured to:
        determine a user pool group including a plurality of UEs in accordance with user pool scheduling information;
        determine sounding reference signal (SRS) resource and configuration information for the plurality of UEs included in the user pool group; and
        determine downlink channel information (DCI) for the plurality of UEs included in the user pool group; and
    a transceiver configured to:
        transmit, to the plurality of UEs included in the user pool group:
            a downlink signal including the user pool scheduling information,
            a dynamic downlink control signal including the SRS resource and configuration information based on the user pool scheduling information,
            the DCI in accordance with a radio network temporary identification (RNTI) over a UE-common search space of the dynamic downlink control signal; and
        receive, from the plurality of UEs included in the user pool group, SRS based on the SRS resource and configuration information included in the user pool scheduling information transmitted from the BS.

9. The BS of claim 8, wherein:
    the at least one processor is further configured to determine channel state information-reference signal (CSI- RS) resource and configuration information for the plurality of UEs included in the user pool group; and the transceiver is further configured to:
   transmit, to the plurality of UEs included in the user pool group, the dynamic downlink control signal including the CSI-RS resource and configuration information based on the user pool scheduling information; and
   receive, from the plurality of UEs included in the user pool group, a CSI based on the CSI-RS resource and configuration information included in the user pool scheduling information transmitted from the BS.

10. The BS of claim 8, wherein:
the at least one processor is further configured to determine physical uplink control channel (PUCCH) resource and configuration information for the plurality of UEs included in the user pool group; and
the transceiver is further configured to:
   transmit, to the plurality of UEs included in the user pool group, the dynamic downlink control signal including the PUCCH resource and configuration information based on the user pool scheduling information; and
   receive, from the plurality of UEs included in the user pool group, a channel quality information (CQI) based on the PUCCH resource and configuration information transmitted from the BS.

11. The BS of claim 8, wherein the DCI includes active user set information indicating identity of each of the scheduled UEs in the user pool group, the active user set information comprising bitmap information that indicate the identity of each of the scheduled UEs.

12. The BS of claim 8, wherein the DCI includes a group scheduling mode indicating a configuration of each of the scheduled UEs in the user pool group, the group scheduling mode comprises at least one of measurement, reception, or transmission information of at least one of uplink or downlink signal between the BS and each of the scheduled UEs included in the user pool group.

13. The BS of claim 8, wherein the DCI includes reference signal (RS) allocation information for at least one active UE of the plurality of UEs included in the user pool group, the RS allocation information comprising at least one of a first RS port for a signal part or a second RS port for interference part in accordance with CSI estimation.

14. The BS of claim 8, wherein the user pool scheduling information includes information identifying each of the plurality of UEs that are included in a UE pool scheduled by the user pool scheduling information.

15. A method of operating a user equipment (UE) in a wireless communication system, the method comprising:
receiving, from a base station (BS):
   a downlink signal including user pool scheduling information,
   a dynamic downlink control signal including sounding reference signal (SRS) resource and configuration information based on the user pool scheduling information, and
   downlink channel information (DCI) in accordance with a radio network temporary identification (RNTI) over a UE-common search space of the dynamic downlink control signal based on the user pool scheduling information, wherein the UE is included in a user pool group determined by the user pool scheduling information;
determining the SRS resource and configuration information included in the user pool scheduling information received by the dynamic downlink control signal;
determine the DCI based on the user pool group determined by the user pool scheduling information; and
transmitting, to the BS, SRS based on the SRS resource and configuration information included in the user pool scheduling information.

16. The method of claim 15, further comprising:
receiving the dynamic downlink control signal including channel state information-reference signal (CSI-RS) resource and configuration information based on user pool scheduling information;
determining the CSI-RS resource and configuration information included in the user pool scheduling information; and
transmitting, to the BS, CSI based on the CSI-RS resource and configuration information included in the user pool scheduling information received from the BS.

17. The method of claim 15, further comprising:
receiving the dynamic downlink control signal including physical uplink control channel (PUCCH) resource and configuration information based on user pool scheduling information;
determining the PUCCH resource and configuration information included in the user pool scheduling information; and
transmitting, to the BS, channel quality information (CQI) based on the PUCCH resource and configuration information included in the user pool scheduling information received from the BS.

18. The method of claim 15, wherein the DCI includes active user set information indicating identity of each of scheduled UEs in the user pool group, the active user set information comprising bitmap information that indicate the identity of each of the scheduled UEs.

19. The method of claim 15, wherein the DCI includes a group scheduling mode indicating a configuration of each of scheduled UEs in the user pool group, the group scheduling mode comprises at least one of measurement, reception, or transmission information of at least one of uplink or downlink signal between the BS and each of the scheduled UEs included in the user pool group.

20. The method of claim 15, wherein the user pool scheduling information includes information identifying each of a plurality of UEs, including the UE, that are included in a UE pool scheduled by the user pool scheduling information.

* * * * *